US010055475B2

(12) United States Patent
Ishibashi

(10) Patent No.: US 10,055,475 B2
(45) Date of Patent: Aug. 21, 2018

(54) AUTHENTICATION SYSTEM, SYNCHRONIZATION METHOD, AND AUTHENTICATION APPARATUS

(71) Applicant: Yuki Ishibashi, Kanagawa (JP)

(72) Inventor: Yuki Ishibashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 126 days.

(21) Appl. No.: 15/138,659

(22) Filed: Apr. 26, 2016

(65) Prior Publication Data

US 2016/0321443 A1    Nov. 3, 2016

(30) Foreign Application Priority Data

Apr. 29, 2015   (JP) ................................ 2015-092467

(51) Int. Cl.
  *G06F 17/30*     (2006.01)
  *G06F 21/34*     (2013.01)
  *G06F 21/33*     (2013.01)
  *G06F 21/45*     (2013.01)

(52) U.S. Cl.
  CPC ........ *G06F 17/30581* (2013.01); *G06F 21/33* (2013.01); *G06F 21/34* (2013.01); *G06F 21/45* (2013.01); *G05B 2219/31213* (2013.01); *G06F 2221/2117* (2013.01); *G06F 2221/2151* (2013.01)

(58) Field of Classification Search
  CPC .... G06F 21/34; G06F 21/45; G06F 17/30581; G05B 2219/31213
  See application file for complete search history.

(56) References Cited

U.S. PATENT DOCUMENTS

| | | | | | |
|---|---|---|---|---|---|
| 5,684,990 | A | * | 11/1997 | Boothby | G06F 17/30581 |
| 5,983,273 | A | * | 11/1999 | White | G06F 21/10 709/229 |
| 6,122,630 | A | * | 9/2000 | Strickler | G06F 17/30575 |
| 2006/0136519 | A1 | * | 6/2006 | Batta | G06F 17/30575 |
| 2007/0180075 | A1 | * | 8/2007 | Chasman | G06F 17/30575 709/223 |
| 2008/0109497 | A1 | * | 5/2008 | Holenstein | G06F 17/30578 |

FOREIGN PATENT DOCUMENTS

| | | |
|---|---|---|
| JP | 2004-282614 | 10/2004 |
| JP | 2012-221317 | 11/2012 |

* cited by examiner

*Primary Examiner* — Robert B Leung
(74) *Attorney, Agent, or Firm* — Harness, Dickey & Pierce, P.L.C.

(57) ABSTRACT

First user information is to be associated with a first user identifier stored in a first authentication apparatus to second user information associated with a second user identifier stored in a second authentication apparatus or the second user information is to be updated to the first user information, if the second user identifier received from the second authentication apparatus is the same as the first user identifier. First card information is to be associated with the first user identifier and stored in the first storage unit, if the first card information corresponding to the second card information stored in the second authentication apparatus is not stored in the first authentication apparatus and a user having the second user identifier associated with the second card information further has the first user identifier stored in the first authentication apparatus.

18 Claims, 19 Drawing Sheets

FIG.3

| USER ID | USER NAME | USER IDENTIFI-CATION NAME | MAIL ADDRESS | LATEST UPDATE DATE AND TIME | DELETE FLAG |
|---|---|---|---|---|---|
| 1 | user1 | user01 | aaa@bbb | 2014/12/5 | OFF |
| 2 | user2 | user02 | ccc@ddd | 2015/1/30 | OFF |

| CARD ID | USER ID | TYPE | USE START DATE | USE END DATE | LATEST UPDATE DATE AND TIME | EXPIRATION DATE | DELETE FLAG |
|---|---|---|---|---|---|---|---|
| 1 | 1 | NORMAL | 2014/11/13 | NULL | 2014/12/5 | 2015/1/30 | OFF |
| 2 | 2 | NORMAL | 2014/11/20 | NULL | 2015/1/30 | 2015/2/10 | OFF |

| GROUP ID | GROUP NAME | GROUP IDENTI-FICATION NAME | LATEST UPDATE DATE AND TIME | DELETE FLAG |
|---|---|---|---|---|
| 1 | group1 | group01 | 2014/12/5 | OFF |
| 2 | group2 | group02 | 2015/1/30 | OFF |

| GROUP ID | USER ID | LATEST UPDATE DATE AND TIME | DELETE FLAG |
|---|---|---|---|
| 1 | 1 | 2014/12/5 | OFF |
| 1 | 3 | 2014/12/5 | OFF |
| 1 | 5 | 2014/12/5 | OFF |
| 2 | 2 | 2015/1/30 | OFF |
| 2 | 4 | 2015/1/30 | OFF |
| 2 | 6 | 2015/1/30 | OFF |

240

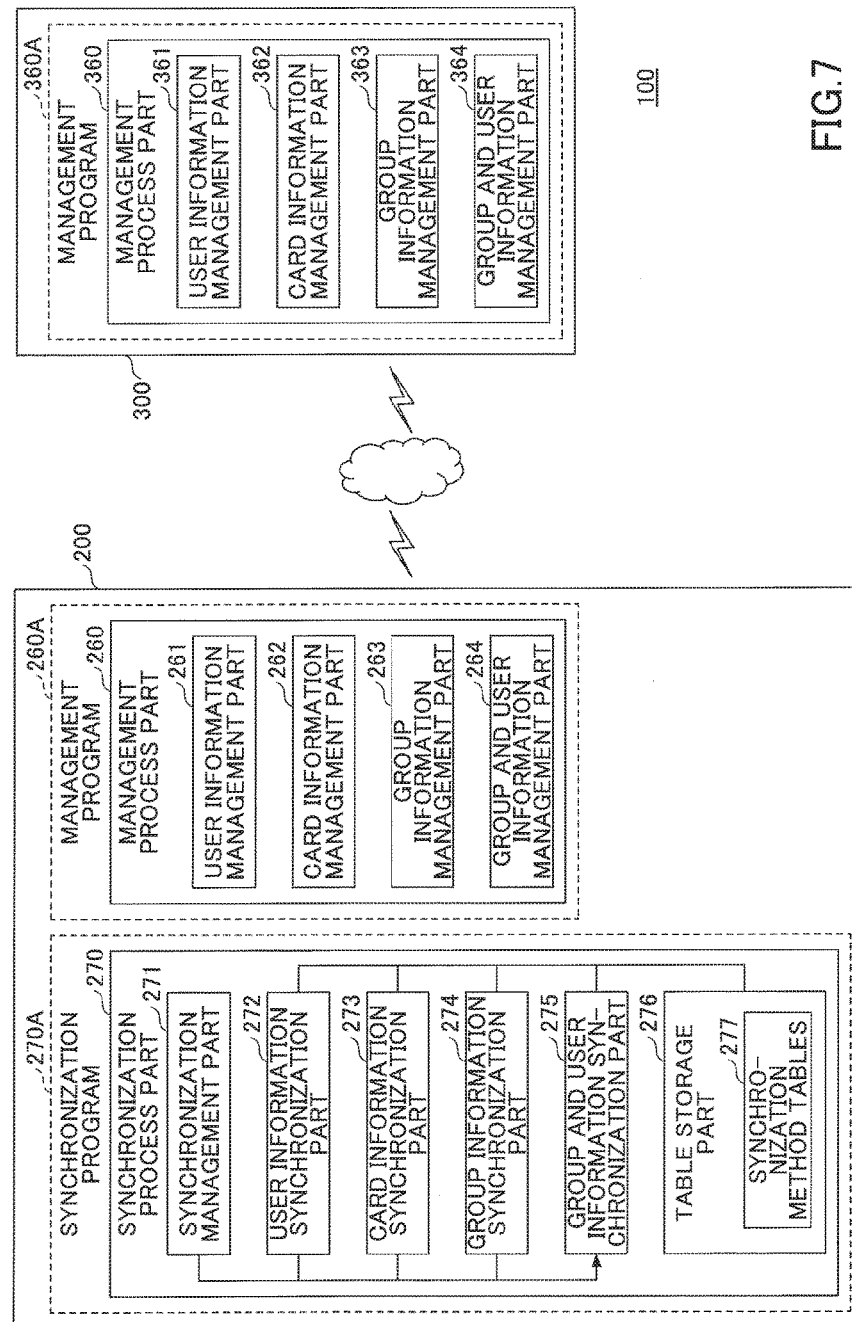

FIG.8A

| DB NAME | SYNCHRONIZATION METHOD |
|---|---|
| USER INFORMATION DB | SYNCHRONIZATION FLAG 1 |
| USER INFORMATION DB | SYNCHRONIZATION FLAG 1 |
| CARD INFORMATION DB | SYNCHRONIZATION FLAG 1 |

| SYNCHRONIZATION FLAG | SYNCHRONIZATION METHOD |
|---|---|
| 1 | DELETE ONE HAVING OLDER LATEST UPDATE DATE BY OVERWRITING IT WITH ONE HAVING NEWER LATEST UPDATE DATE |
| 2 | DELETE ONE HAVING NEWER LATEST UPDATE DATE BY OVERWRITING IT WITH ONE HAVING OLDER LATEST UPDATE DATE |
| 3 | MARGE WITH "OR" OPERATION AND OVERWRITE BOTH WITH OPERATION RESULT |
| 4 | MARGE WITH "AND" OPERATION AND OVERWRITE BOTH WITH OPERATION RESULT |

277B

AUTHENTICATION SYSTEM, SYNCHRONIZATION METHOD, AND AUTHENTICATION APPARATUS

CROSS-REFERENCE TO APPLICATIONS

The present patent application is based on and claims the benefit of priority of Japanese Priority Application No. 2015-092467, filed on Apr. 29, 2015, the entire contents of which are hereby incorporated herein by reference.

BACKGROUND

1. Technical Field

The present disclosure relates to an authentication system, a synchronization method, and an authentication apparatus.

2. Description of the Art

In the related art, technology is known, with which data synchronization among different apparatuses is carried out. "Data synchronization among different apparatuses" is a process of establishing data consistency among the different apparatuses. For example, in the related art, an authentication system having a plurality of authentication servers is known. In the authentication system, data synchronization is carried out among the authentication servers (see Japanese Laid-Open Patent Application No. 2012-221317).

SUMMARY

According to one aspect, an authentication system includes a first authentication apparatus and a second authentication apparatus. The authentication system carries out authentication based on information from an IC card, and includes at least one processor. The at least one processor is configured to update first user information associated with a first user identifier stored in a first storage unit of the first authentication apparatus to second user information associated with a second user identifier stored in a second storage unit of the second authentication apparatus or update the second user information to the first user information, if the second user identifier received from the second authentication apparatus is the same as the first user identifier; and associate first card information with the first user identifier and store the first card information in the first storage unit, if the first card information corresponding to the second card information stored in the second storage unit is not stored in the first storage unit and a user who has the second user identifier associated with the second card information further has the first user identifier stored in the first storage unit.

Other objects, features, and advantages will become more apparent from the following detailed description when read in conjunction with the accompanying drawings.

BRIEF DESCRIPTION OF THE DRAWINGS

FIG. 3 illustrates one example of a user information database;

FIG. 4 illustrates one example of a card information database;

FIG. 5 illustrates one example of a group information database;

FIG. 6 illustrates one example of a group and user information database;

FIG. 7 illustrates a function of each apparatus included in the authentication system;

FIGS. 8A and 8B illustrate an example of synchronization method tables;

DETAILED DESCRIPTION OF EMBODIMENTS

In such an authentication system as having a plurality of authentication servers as described above, if, for example, one of the authentication servers malfunctions and cannot then be used, another of the authentication servers is instead used to carry out authentication. In this case, data synchronization is carried out among the authentication servers. When one authentication server is synchronized based on data that another authentication server has, some information that the authentication server has may be lost as a result of information that the other authentication server has being used to overwrite information that the authentication server has. If such an information loss occurs, authentication may not be carried out properly thereafter. For example, if respective sets of card information of a plurality of IC cards of a user are stored in different authentication servers, and some of the card information is lost during the synchronization, the user may become unable to use the corresponding IC card(s).

An object of embodiments is to carry out data synchronization among a plurality of authentication servers, or the like, without losing information. Hereinafter, "data synchronization" may be simply referred to as "synchronization". Also, "carrying out synchronization of A with B" may be simply referred to as "synchronizing A with B", for example.

Figure 1:
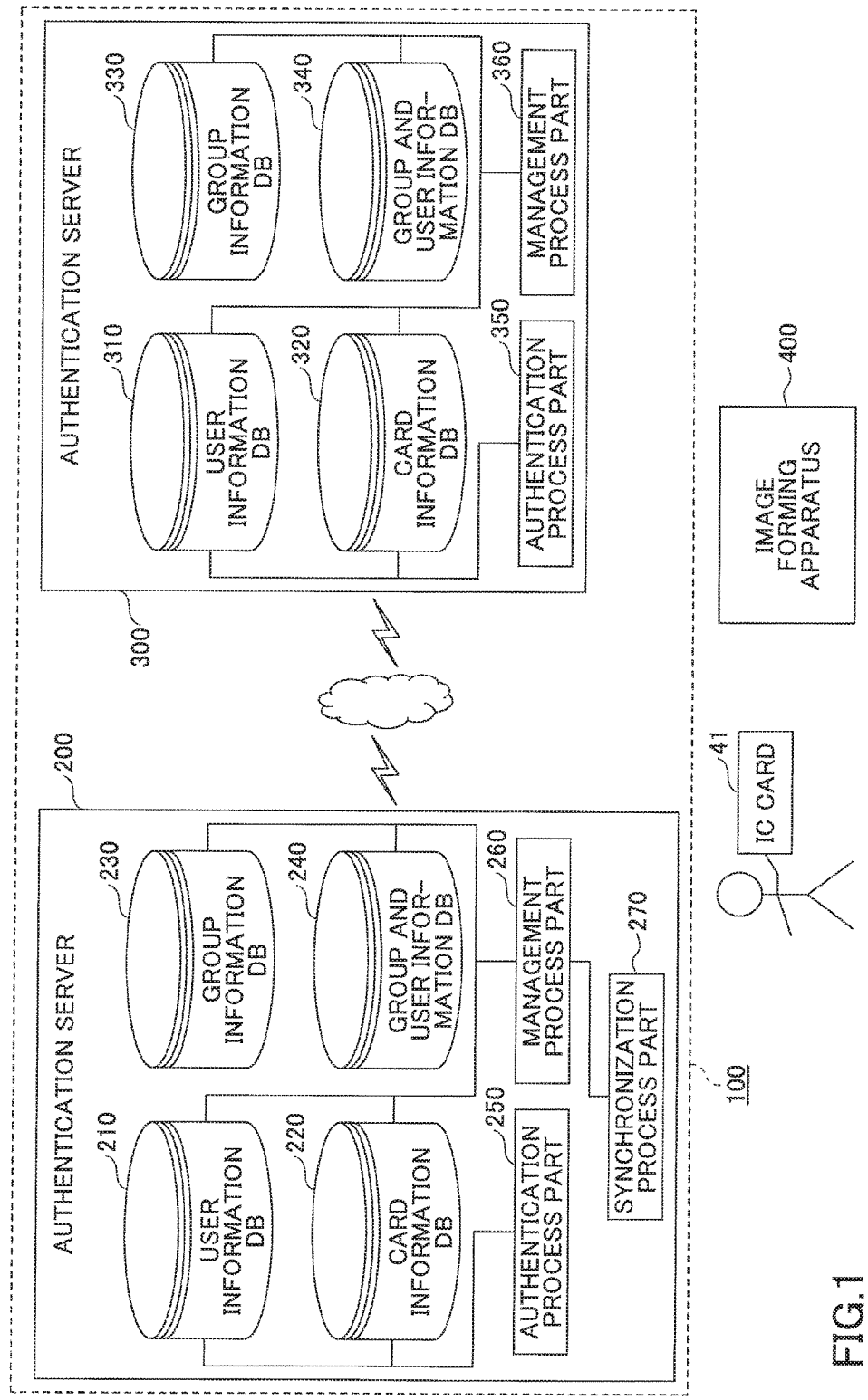
FIG. 1 illustrates a system configuration of an authentication system.

With reference to the drawings, embodiments will be described. FIG. 1 illustrates a system configuration of an authentication system.

The authentication system 100 according to a first embodiment includes an authentication server 200 and an authentication server 300. In the authentication system 100, the higher priority is set to the authentication server 200 than that of the authentication server 300.

Therefore, according to the first embodiment, if the authentication system 100 receives an authentication request, for example, first the authentication server 200 carries out authentication in response to the request. However, if the authentication server 200 is not capable of carrying out authentication due to a malfunction, a communications trouble, or the like, for example, the authentication server 300 then carries out authentication instead of the authentication server 200.

Such an authentication request to the authentication system 100 can be sent from an image forming apparatus 400, for example. When a user holds an Integrated Circuit (IC) card 41 over the image forming apparatus 400, for example, the image forming apparatus 400 acquires from the IC card 41 a card ID that identifies the IC card 41. The image forming apparatus 400 then transmits the acquired card ID to the authentication system 100. The authentication system 100 receives the card ID via the authentication server 200, and authenticates it. In addition to, or instead of, such card authentication, the image forming apparatus 400 can acquire authentication information, such as a user name, a password, and/or the like, that is/are input by the user, and transmit it to the authentication server 200. The authentication system 100 can carry out authentication together with an external authentication system connected to the authentication system 100.

In order to allow such a flexible operation that a user uses a normal card and a temporary card together, a user belongs to a plurality of divisions and uses respective cards for the corresponding divisions, and so forth, it is assumed that each user has a plurality of IC cards and receive authentication for each IC card.

The authentication server 200 includes a user information database 210, a card information database 220, a group information database 230, and a group and user information database 240. The authentication server 200 further includes an authentication process part 250, a management process part 260, and a synchronization process part 270.

The user information database 210 stores information concerning users of the image forming apparatus 400. The card information database 220 stores information concerning IC cards. The group information database 230 stores information concerning "groups". The group and user information database 240 stores, for each "group", information indicating the users who belong to the group.

The authentication process part 250 authenticates a user of the image forming apparatus 400 based on a card ID received from the image forming apparatus 400. The management process part 260 manages the respective databases of the authentication server 200. The synchronization process part 270 carries out synchronization between the respective databases of the authentication server 200 and the respective databases of the authentication server 300.

The authentication server 300 includes a user information database 310, a card information database 320, a group information database 330, and a group and user information database 340. The authentication server 300 further includes an authentication process part 350, and a management process part 360.

The respective databases of the authentication server 300 are synchronized with the respective databases of the authentication server 200. The authentication process part 350 carries out processes the same as or similar to those of the authentication process part 250 of the authentication server 200. The management process part 360 carries out processes the same as or similar to those of the management process part 260 of the authentication server 200.

In the authentication system 100, when the respective databases are synchronized between the authentication server 200 and the authentication server 300, no information is lost. Therefore, according to the authentication system 100, the authentication server 200 can be used to carry out an authentication process, and also, the authentication server 300 can be used to carry out the same authentication process. For example, according to the authentication system 100, synchronization can be carried out without losing sets of card information stored in the authentication server 200 and the authentication server 300, respectively. As a result, the authentication server 200 can authenticate all the IC cards, and also, the authentication server 300 can authenticate all the IC cards. Thus, the user can use all the IC cards.

Figure 2:
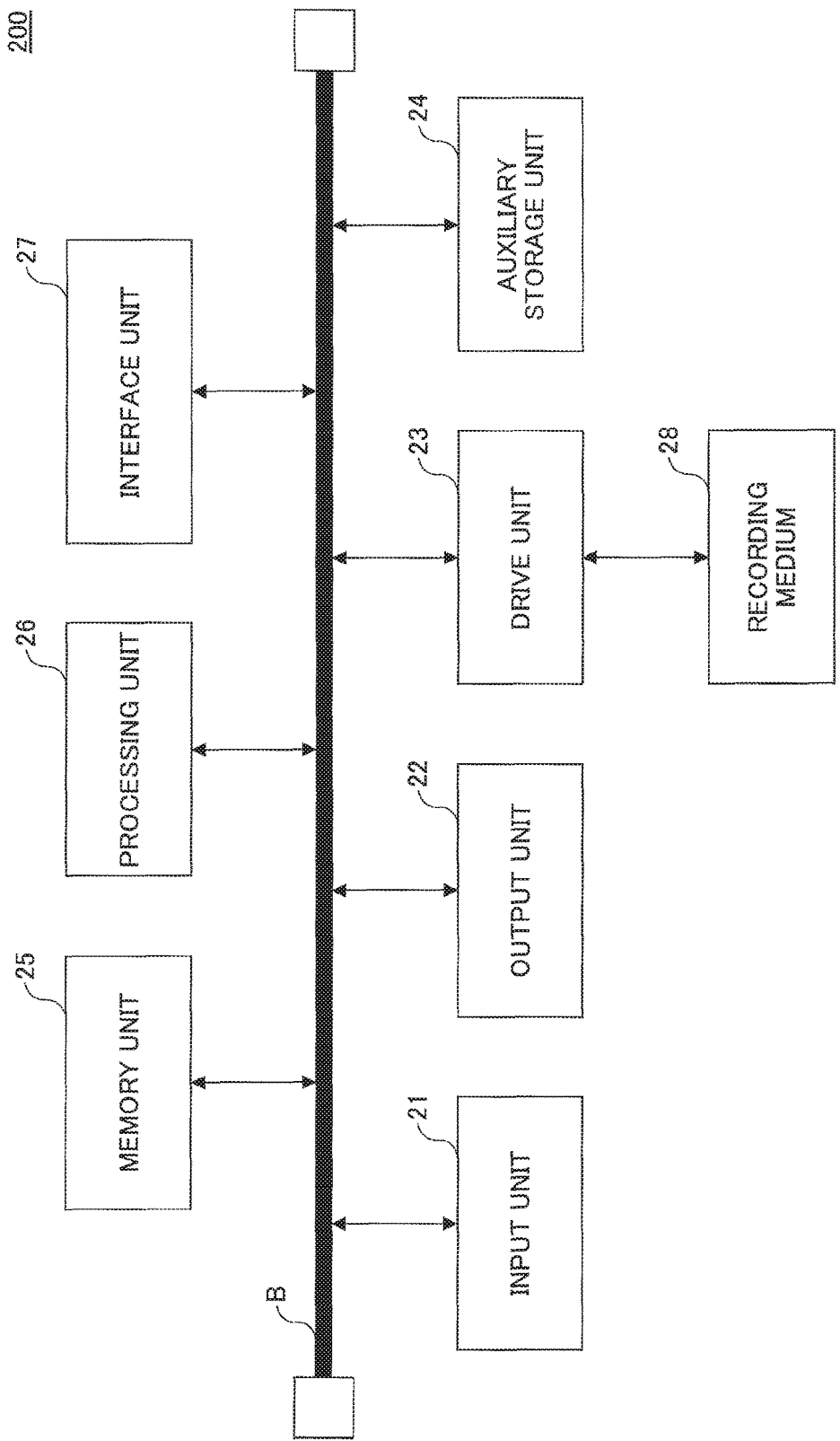
FIG. 2 illustrates one example of a hardware configuration of an authentication server.

With reference to FIG. 2, a hardware configuration of the authentication server 200 will be described. FIG. 2 illustrates one example of a hardware configuration of the authentication server.

The authentication server 200 includes an input unit 21, an output unit 22, a drive unit 23, an auxiliary storage unit 24, a memory unit 25, a processing unit 26, and an interface unit 27 that are connected mutually by a bus B.

The input unit 21 includes a keyboard, a mouse, and/or the like, and is used to input various signals. The output unit 22 includes a display unit, or the like, and is used to display various windows (i.e., screen pages), data, and/or the like. The interface unit 27 includes a modem, a LAN card, and/or the like, and is used to connect to a network.

A synchronization program is included in various programs used to control the authentication server 200. The various programs include an authentication program and a management program. The synchronization program is provided through, for example, a recording medium 28 that is distributed, being downloaded via a network, or the like. Specific examples of the recording medium 28 storing the synchronization program include various recording media such as recording media that optically, electrically, or magnetically store information such as a CD-ROM, a flexible disk, a magneto-optical disc, and so forth, semiconductor memories that electrically store information such as a ROM, a flash memory, and so forth.

The synchronization program is installed in the auxiliary storage unit 24 from the recording medium 28 through the driver unit 22 as a result of the recording medium 28 storing the synchronization program being set to the driver unit 22. The synchronization program downloaded via a network is installed in the auxiliary storage unit 24 via the interface unit 27.

The auxiliary storage unit 24 stores the installed synchronization program, and also, stores files, data, and so forth. The memory unit 25 stores the synchronization program when the authentication server 200 is started, after being read from the auxiliary storage unit 24. The processing unit 26 carries out various processes (described later) according to the synchronization program thus stored in the memory unit 25.

The hardware configuration of the authentication server 300 is the same as or similar to the authentication server 200, and thus, duplicate description will be omitted.

With reference to FIGS. 3-6, the respective databases of the authentication server 200 and the authentication server 300 will be described. The information items and values of the respective databases of the authentication server 300 are the same as or similar to those of the respective databases of the authentication server 200. Therefore, with reference to FIGS. 3-6, the respective databases of the authentication server 200 will be described.

FIG. 3 illustrates one example of the user information database. The user information database 210 has information items that include "user ID", "user name", "user identification name", "mail address", "latest update date and time", and "delete flag".

In the user information database 210, the item "user ID" and the other items are associated with each other. Hereinafter, the information that includes the value of the item "user ID", and the values of the other items associated with the value of the item "user ID" will be referred to as "user information".

The value of the item "user ID" indicates an identifier for identifying the corresponding user. The value of the item "user name" indicates the name of the user. The value of the item "user name" can be set by the user himself or herself.

The value of the item "user identification name" indicates an identifier to uniquely identify the user. The value of the item "user identification name" can be acquired from an external authentication system connected to the authentication system 100 and stored in the user information database 210, or can be set by an administrator. Also, the attribute information such as the user IDs, the mail addresses, or the like, can be acquired from the external authentication system.

The value of the item "mail address" is a mail address corresponding to the user name. The value of the item "latest update date and time" indicates the latest update date and time of the user information. The value of the item "delete flag" indicates whether the user information is valid. If the value of the item "delete flag" is "OFF", this means that the user information including the delete flag is valid. If the value of the item "delete flag" is "ON", this means that the user information including the delete flag is invalid, and thus, this is equivalent to the fact that the user information is deleted. For example, the user information having the value "ON" in the item "delete flag" can be periodically deleted.

The user information database 210 can have items other than those shown in FIG. 3. For example, the user information database 210 can have an item(s) indicating an available function(s) of the image forming apparatus 400 for each user, an item(s) indicating an attribute(s) of the user, or the like. The "attribute" of the user means, for example, the division in the company to which the user belongs, or the like.

FIG. 4 illustrates one example of the card information database. The card information database 220 has information items including "card ID", "user ID", "type", "use start date", "use end date", "expiration date", "latest update date and time", and "delete flag".

In the card information database 220, the item "card ID" and the other items are associated with each other. Hereinafter, the information including the value of the item "card ID", and the values of the other items associated with the value of the item "card ID" will be referred to as "card information".

The value of the item "card ID" indicates an identifier of an IC card to be held over the image forming apparatus 400. The value of the item "type" indicates a type of the IC card. The type of the IC card is, for example, a card to be used by an administrator of the authentication system 100 and/or the image forming apparatus 400, a card to be used by a general user of the image forming apparatus 400, and so forth.

The value of the item "use start date" indicates the date on which use of the corresponding IC card started. The value of the item "use end date" indicates the date on which use of the corresponding IC card ended. In the example of FIG. 4, the IC cards having the card ID "1" and the card ID "2" are those that are currently being used.

The value of the item "expiration date" indicates the expiration date, until when the card identified by the IC card information remains usable.

FIG. 5 illustrates one example of a group information database. The group information database 230 has information items that include "group ID", "group name", "group identification name", "latest update date and time", and "delete flag".

In the group information database 230, the item "group ID" and the other items are associated with each other. Hereinafter, the information that includes the value of the item "group ID", and the values of the other items associated with the value of the item "group ID" will be referred to as "group information".

The value of the item "group ID" indicates an identifier to identify the corresponding "group". The value of the item "group name" indicates the name of the group. The value of the item "group name" can be set by a user.

The value of the item "group identification name" indicates an identifier to uniquely identify the group. The value of the item "group identification name" can be acquired from the external authentication system connected to the authentication system 100 and stored in the group information database 230, or can be set by the administrator. The attribute information such as the group IDs, the types, or the like, can be acquired from the external authentication system.

FIG. 6 illustrates one example of the group and user information database. The group and user information database 240 has information items that includes "group ID", "user ID", "latest update date and time", and "delete flag".

In the group and user information database 240, the item "group ID" and the other items are associated with each other. Hereinafter, the information including the value of the item "group ID", and the values of the other items associated with the value of the item "group ID" will be referred to as "user and group information".

In the example of FIG. 6, it can be seen that in the group having the group ID "1", the users having the user IDs "1", "3", and "5" are included.

With reference to FIG. 7, functions of the authentication servers 200 and 300 of the authentication system 100 will be described. FIG. 7 illustrates a function of each apparatus included in the authentication system. FIG. 7 includes functions, which do not include, for example, the authentication process parts 250 and 350 (see FIG. 1), which have the same functions as those of the related art.

Functions of the authentication server 200 will be now described. The authentication server 200 includes the management process part 260, and the synchronization process part 270. The management process part 260 is implemented as a result of the processing unit 26 of the authentication server 200 executing the management program. The synchronization process part 270 is implemented as a result of the processing unit 26 of the authentication server 200 executing the synchronization program.

The management process part 260 manages the respective databases of the authentication server 200. The management process part 260 includes a user information management part 261, a card information management part 262, a group information management part 263, and a group and user information management part 264.

The user information management part 261 manages the user information database 210. The card information management part 262 manages the card information database 220. The group information management part 263 manages the group information database 230. The group and user information management part 264 manages the group and user information database 240.

The respective management parts carry out, for example, writing information to the corresponding databases, searches the corresponding databases, reading information from the corresponding databases, and so forth.

The synchronization process part 270 includes a synchronization management part 271, a user information synchronization part 272, a card information synchronization part 273, a group information synchronization part 274, a group and user information synchronization part 275, and a table storage part 276.

The synchronization management part 271 sends synchronization instructions to the respective synchronization parts. The synchronization management part 271 can send the synchronization instructions, for example, every predetermined time period, or can send the synchronization instructions when the authentication server 200 or the authentication server 300 receives a request to register new information.

Further, a case is assumed where, the authentication server 200, for example, malfunctions and thus, cannot then be used, then the authentication server 300 carries out authentication, and thereafter, for example, the normal function of the authentication server 200 is restored, and thus, can then be used. In such a case, the synchronization management part 271 can send the synchronization instructions when, for example, the normal function of the authentication server 200 is restored, and thus, can be used. The synchronization management part 271 can send the synchronization instructions to the respective synchronization parts in response to receiving a synchronization request from the administrator of the authentication system 100, or the like.

The user information synchronization part 272 synchronizes between the user information database 210 and the user information database 310. The card information synchronization part 273 synchronizes between the card information database 220 and the card information database 320. The group information synchronization part 274 synchronizes between the group information database 230 and the group information database 330. The group and user information synchronization part 275 synchronizes between the group and user information database 240 and the group and user information database 340.

The table storage part 276 stores synchronization method tables 277. The synchronization method tables 277 are read when each synchronization part carries out the synchronization process. Details of the synchronization method tables 277 will be described later.

The authentication server 300 has the management process part 360. The management process part 360 is implemented as a result of the processing unit of the authentication server 300 executing the management program 360A.

The management process part 360 includes a user information management part 361, a card information management part 362, a group information management part 363, and a group and user information management part 364.

The respective management parts of the management process part 360 have the functions same as or similar to the respective management parts of the authentication server 200.

The user information management part 361 manages the user information database 310. The card information management part 362 manages the card information database 320. The group information management part 363 manages the group information database 330. The group and user information management part 364 manages the group and user information database 340.

With reference to FIGS. 8A and 8B, the synchronization method tables 277 will be described. FIGS. 8A and 8B illustrate an example of synchronization method tables. FIG. 8A illustrates one example of a synchronization table 277A. FIG. 8B illustrates one example of a synchronization table 277B.

The synchronization method tables 277 include the synchronization table 277A and the synchronization table 277B.

The synchronization table 277A associates each database with a synchronization flag indicating a synchronization method. The synchronization table 277B associates the synchronization flag with the synchronization method.

For example, the user information database 210 is associated with a synchronization flag 1 in the synchronization table 277A. The synchronization flag 1 is associated with such a synchronization method to "delete one having older "latest update date" by overwriting it with one having newer "latest update date"" in the synchronization table 277B.

Therefore, in the example of FIGS. 8A and 8B, in the synchronization process of the user information database 210, the set of information having the older "latest update date" is deleted as a result of it being overwritten with the set of information having the newer "latest update date".

In FIGS. 8A and 8B, the synchronization method tables 277 include the two tables. However, the synchronization method tables 277 are not limited thereto. For example, the synchronization method tables 277 can be a single table where the respective databases shown in the synchronization table 277A are associated with the corresponding synchronization methods shown in the synchronization table 277B.

Figure 9:
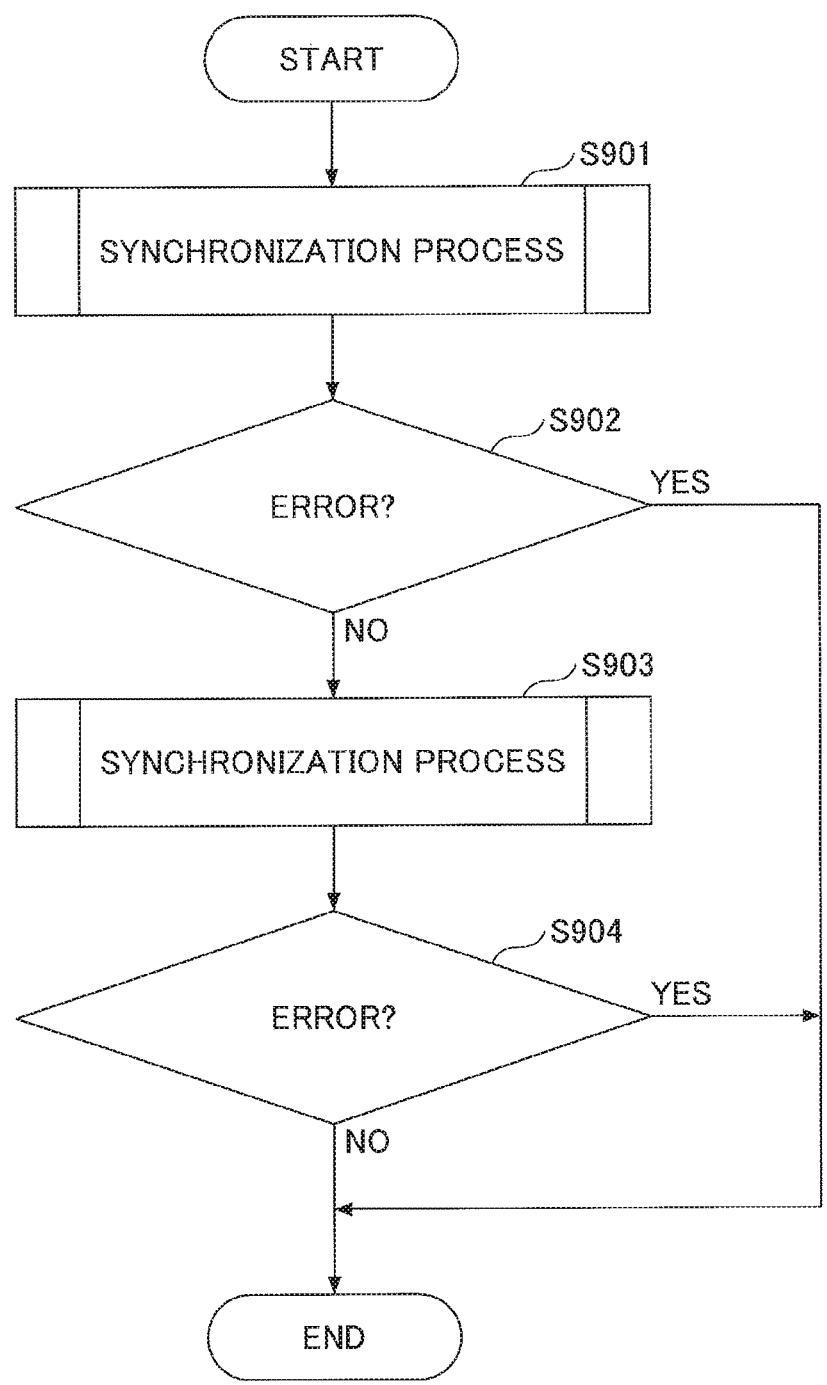
FIG. 9 is a flowchart illustrating operations of the authentication system.

With reference to FIG. 9, operations of the authentication system 100 will be described. FIG. 9 is a flowchart illustrating operations of the authentication system.

In the authentication system 100, the authentication server 200 causes the synchronization process part 270 to synchronize each database of the authentication server 300 with the corresponding database of the authentication server 200 (step S901). Actually, the authentication server 200 sends a synchronization instruction to each synchronization part of the authentication server 200 through the synchronization management part 271 to carry out the synchronization process.

Then, the authentication server 200 determines whether an error occurs in the synchronization process part 270 (step S902).

If an error occurs in step S902, the authentication server 200 ends the process of the synchronization process part 270, and waits for subsequent synchronization timing. In this case, the authentication server 200 can return each database to its previous state before the start of the current synchronization process, i.e., carry out a rollback process.

If no error occurs in step S902, the authentication server 200 causes the synchronization process part 270 to synchronize each database of the authentication server 200 with the corresponding database of the authentication server 300 (step S903).

Then, the authentication server 200 determines whether an error occurs in the synchronization process part 270 (step S904). If an error occurs in step S904, the authentication server 200 ends the process of the synchronization process part 270, and waits for subsequent synchronization timing.

If no error occurs in step S904, the authentication server 200 waits for subsequent synchronization timing.

Figure 10:
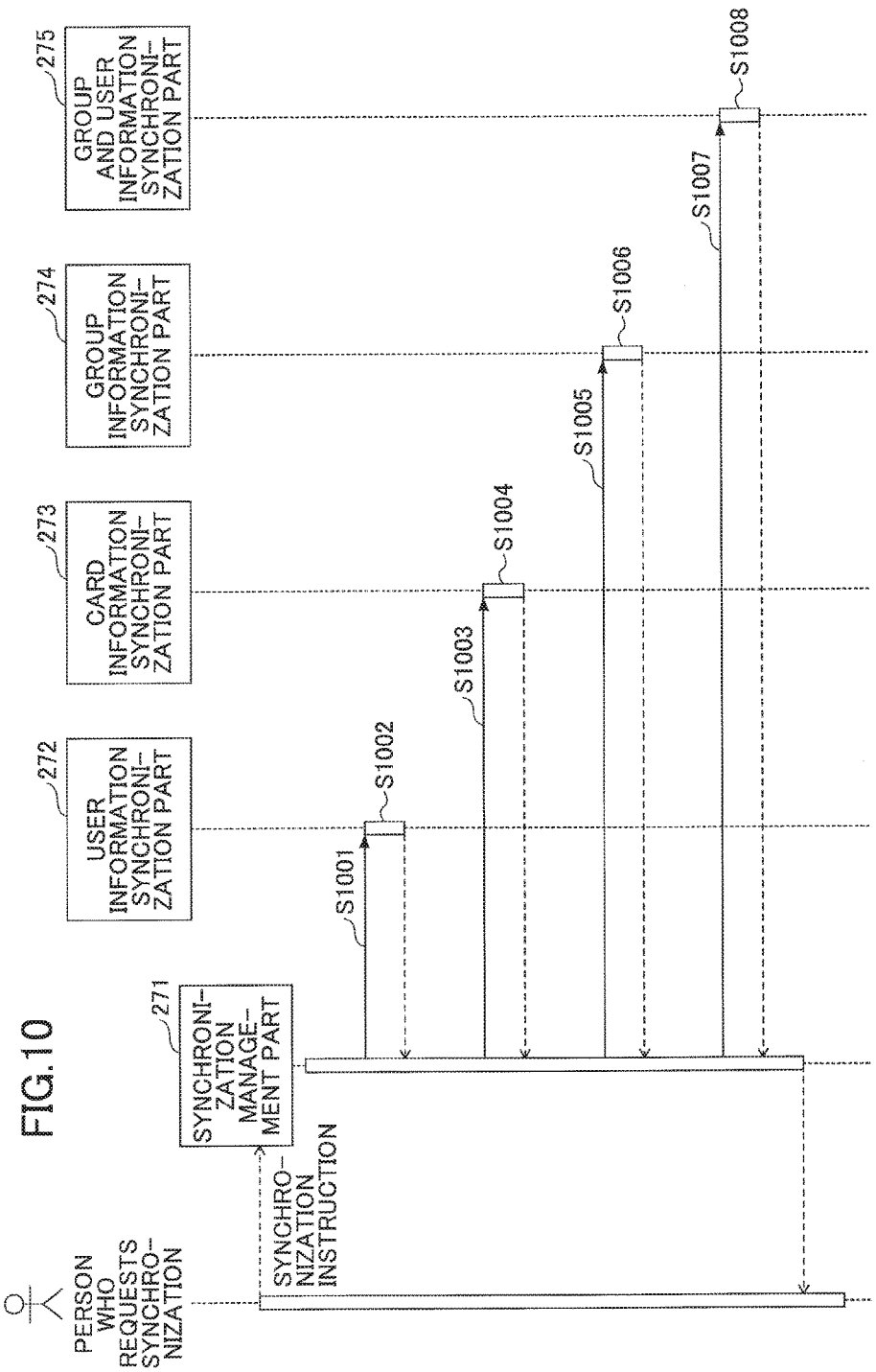
FIG. 10 is a sequence diagram illustrating operations of the authentication system.

With reference to FIG. 10, the synchronization process in the authentication system 100 will be described. FIG. 10 is a sequence diagram illustrating operations of the authentication system 100. FIG. 10 illustrates details of step S901 in FIG. 9.

In response to receiving a synchronization request from, for example, the administrator of the authentication server 200, a synchronization instruction is given to the user information synchronization part 272 by the synchronization management part 271 in the authentication server 200 (step S1001). In response to the synchronization instruction, the user information synchronization part 272 synchronizes the user information database 310 with the user information database 210 (step S1002). The user information synchronization part 272 carries out the synchronization process for each set of user information to be synchronized according to the synchronization instruction. Details of the synchronization process of the user information will be described later.

Then, the synchronization management part 271 sends a synchronization instruction to the card information synchronization part 273 (step S1003). In response a reception of the synchronization instruction, the card information synchronization part 273 synchronizes the card information database 320 with the card information database 220 (step S1004). The card information synchronization part 273 carries out the synchronization process for each set of card information to be synchronized according to the synchronization instruction. Details of the synchronization process of the card information will be described later.

Then, the synchronization management part 271 sends a synchronization instruction to the group information synchronization part 274 (step S1005). In response to receiving the synchronization instruction, the group information synchronization part 274 synchronizes the group information database 330 with the group information database 230 (step S1006). The group information synchronization part 274 carries out the synchronization process for each set of group information to be synchronized according to the synchronization instruction. Details of the synchronization process of the group information will be described later.

Then, the synchronization management part 271 sends a synchronization instruction to the group and user information synchronization part 275 (step S1007). In response to receiving the synchronization instruction, the group and user information synchronization part 275 synchronizes the group and user information database 340 with the group and user information database 240 (step S1008). The group and user information synchronization part 275 carries out the synchronization process for each set of group and user information to be synchronized according to the synchronization instruction. Details of the synchronization process of the group and user information will be described later.

With reference to FIGS. 11-17, the synchronization processes of the respective databases shown in FIG. 10 will be described.

Figure 11:
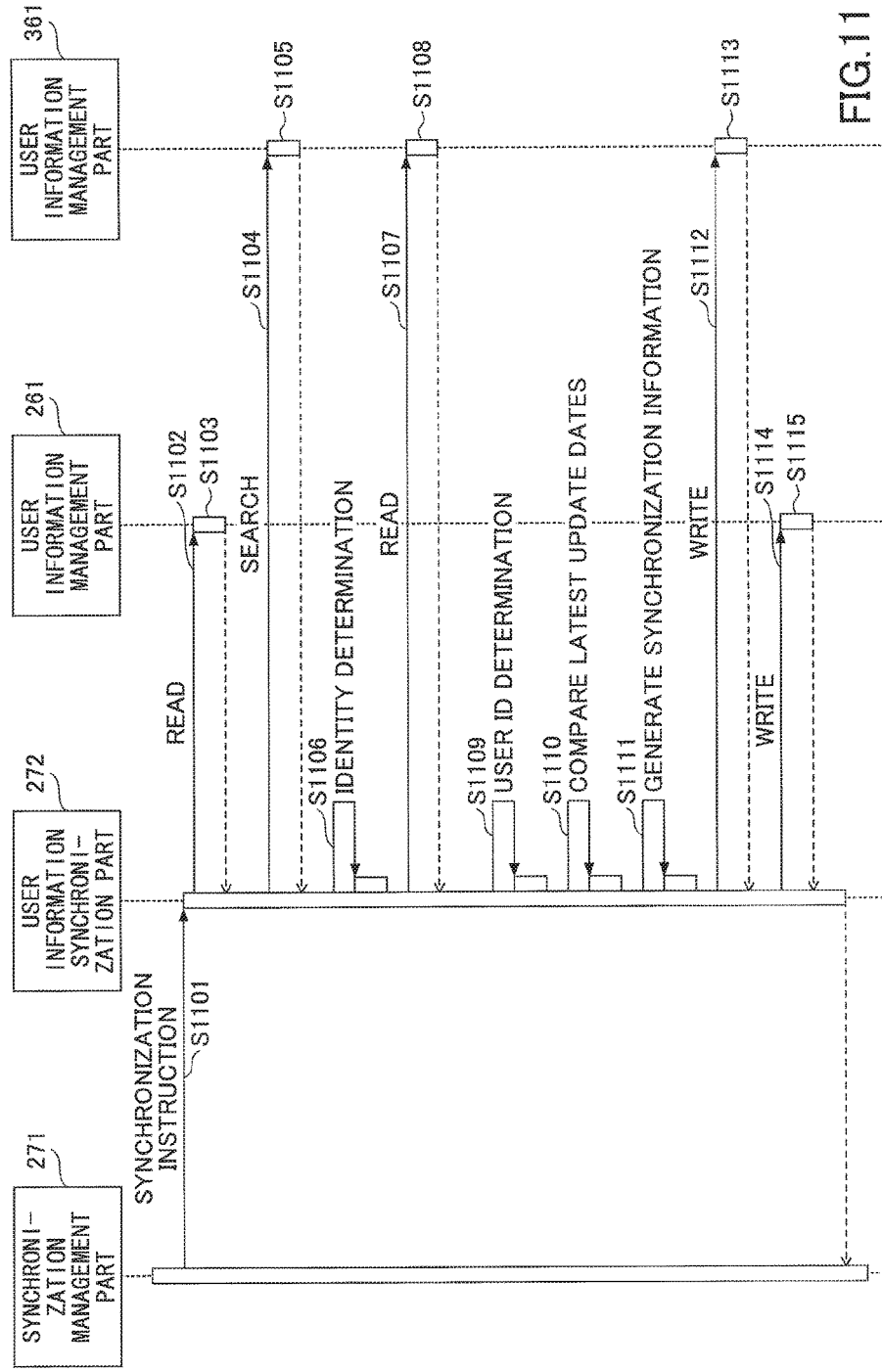
FIG. 11 is a sequence diagram illustrating a process of synchronizing the user information database.

FIG. 11 is a sequence diagram illustrating the synchronization process of the user information database. FIG. 11 illustrates the synchronization process for a case where the user information having the user ID "1" is to receive the synchronization process. FIG. 11 illustrates the process for a case where, in an identity determination process described later, it is determined that the authentication server 200 and the authentication server 300 have the user information of the same user.

In the authentication server 200, the synchronization management part 271 sends a synchronization instruction to the user information synchronization part 272 for the user information having the user ID "1" (step S1101).

In response to receiving the synchronization instruction, the user information synchronization part 272 requests the user information management part 261 to read the user information having the user ID "1" (step S1102). In response to receiving the request, the user information management part 261 reads from the user information database 210 the user information having the user ID "1", and transfers it to the user information synchronization part 272 (step S1103). At this time, the user information management part 261 acquires the user identification name "User01" included in the user information.

The user information synchronization part 272 then requests the user information management part 361 of the authentication server 300 to search the user information database 310 using the user identification name "User01" as a search key (step S1104). The user information management part 361 searches the user information database 310 using the user identification name "User01" as a search key, and transfers the search result to the user information synchronization part 272 (step S1105). The "search result" can be information that indicates whether the search result is acquired.

Based on the received search result, the user information synchronization part 272 carries out an identity determination for the user information (step S1106). An "identity determination for the user information" is a process to determine whether the user, whose user information is acquired by the user information synchronization part 272 as the search result in step S1105, is the same as the user, whose user information is acquired in step S1103. Details of the identity determination process will be described later.

If it is thus determined that the user information databases 210 and 310 include the same user's user information, the user information synchronization part 272 requests the user information management part 361 to read the user information that has the user identification name "User01" (step S1107). In response to the request, the user information management part 361 reads from the user information database 310 the corresponding user information, and transfers it to the user information synchronization part 272 (step S1108). Steps S1104-S1108 can be included in steps S1104 and S1105 together.

Then, the user information synchronization part 272 carries out a user determination process based on the two sets of user information acquired in steps S1103 and S1108, respectively (step S1109). For example, in a case where the two sets of user information correspond to the same user even if the user uses the different user IDs for the two sets of user information, the two sets of user information are determined to reflect the same synchronization information.

Then, the user information synchronization part 272 compares the latest update dates and times of the two sets of user information acquired in steps S1103 and S1108, respectively (step S1110). If the latest update dates and times are the same as each other in step S1110, it is determined that the respective sets of information of the authentication server 200 and the authentication server 300 are the same, and thus, it is not necessary to carry out synchronization, and the process ends. If the latest update dates and times are not the same as each other in step S1110, the process proceeds to step S1111. In step S1110, not only the latest update dates and times but also all the items of the user information can be compared to determine whether to carry out synchronization.

Subsequent to step S1110, the user information synchronization part 272 reads the synchronization method tables 277 stored in the table storage part 276, and generates user information to be reflected in the user information databases 210 and 310 (step S1111). Hereinafter, the information to be reflected in both the authentication server 200 and the authentication server 300 in the synchronization process will be referred to as "synchronization information".

Then, based on the synchronization method determination result from step S1111, the user information synchronization part 272 requests the user information management part 361 to reflect the synchronization information (step S1112). The user information management part 361 reflects the synchronization information in the user information database 310 (step S1113).

Then, based on the synchronization method determination result from step S1111, the user information synchronization part 272 requests the user information management part 261 to reflect the synchronization information (step S1114). The user information management part 261 reflects the synchronization information in the user information database 210 (step S1115), and ends the synchronization process. The user information synchronization part 272 carries out the process of FIG. 11 on all the sets of user information stored in the user information database 210.

If it is determined in step S1106 that the user information of the same user is not included in the user information database 310, the user information synchronization part 272 can add the user information acquired in step S1102 to the user information database 310 in steps S1112 and S1113, while skipping over steps S1107-S1111. At this time, steps S1114-S1115 can be omitted.

Instead, if it is determined in the identity determination process of step S1106 that the user information database 310 does not include the corresponding user information as mentioned above, the user information synchronization part 272 can end the synchronization process in response to the determination result.

Details of the process of generating the synchronization information and reflecting the synchronization information in steps S1110-S1114 of FIG. 11 will be described later.

Figure 12:
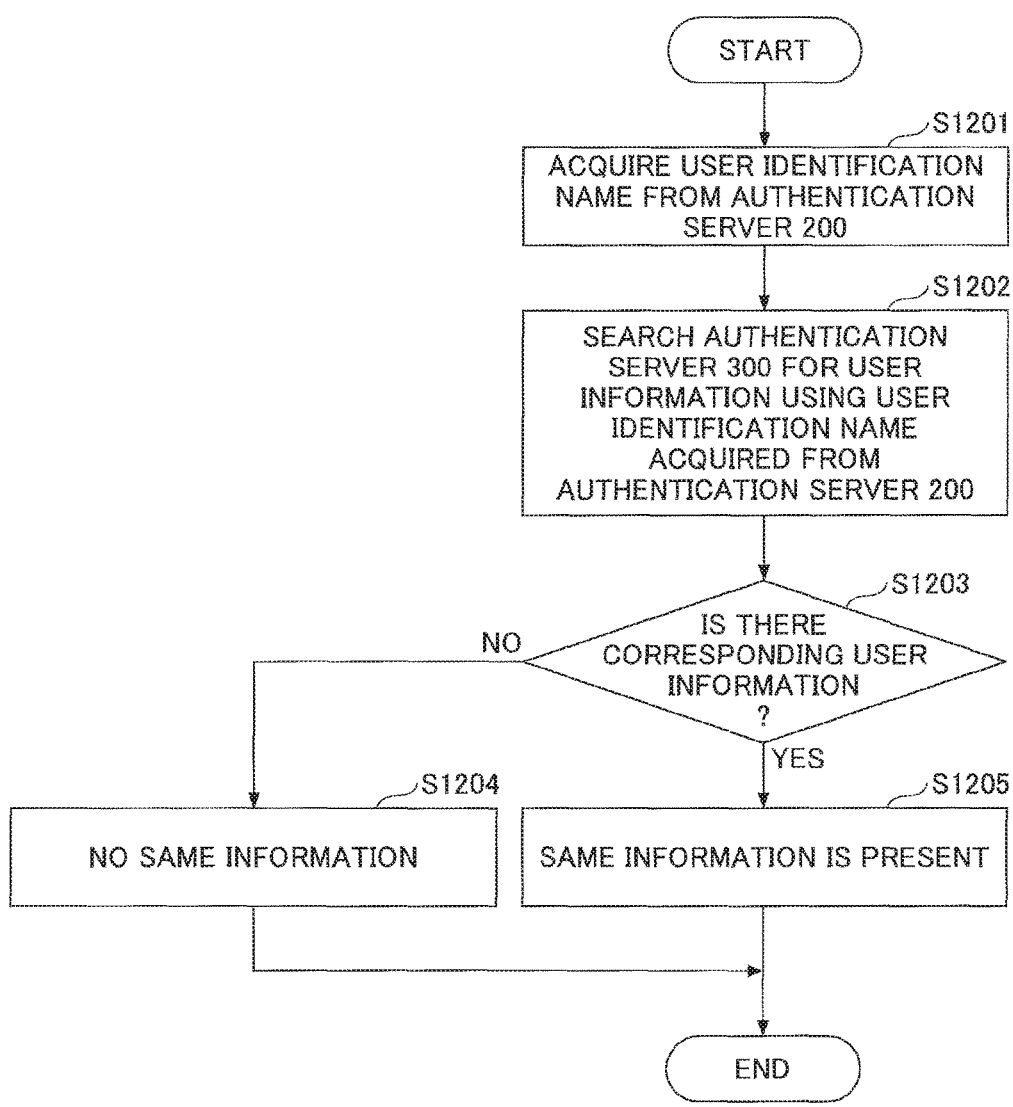
FIG. 12 is a flowchart illustrating a process of determining identity.

With reference to FIG. 12, the process of the user information synchronization part 272 will be further described. FIG. 12 is a flowchart illustrating a process to determine identity. FIG. 12 illustrates details of the process of steps S1104-S1106 in FIG. 11.

The user information synchronization part 272 causes the user information management part 261 to acquire from the user information database 210 the user identification name "User01" corresponding to the user ID "1" (step S1201).

Then, the user information synchronization part 272 requests the user information management part 361 to search the user information database 310 using the user identification name "User01" as a search key to cause it to carry out the search (step S1202).

The user information synchronization part 272 receives the search result from the user information management part 361, and determines whether the user information database 310 includes the user information having the user identification name "User01" (step S1203).

If the user information database 310 does not include the corresponding user information in step S1203, the user information synchronization part 272 determines that the authentication server 300 does not have the user information of the same user (step S1204), ends the identity determination process, and proceeds to the subsequent process.

If the user information database 310 includes the corresponding user information in step S1203, the user information synchronization part 272 determines that the authentication server 300 has the user information of the same user (step S1205), ends the identity determination process, and proceeds to the subsequent process.

The identity determination process shown in FIG. 12 is carried out also in each synchronization part that will be described later.

For example, when the card information synchronization part 273 carries out the identity determination process, the user information of FIG. 12 is read as the card information, and the user identification name of FIG. 12 is read as the card ID.

When the group information synchronization part 274 carries out the identity determination process, the user information of FIG. 12 is read as the group information, and the user identification name included in the user information is read as the group identification name included in the group information.

Figure 13:
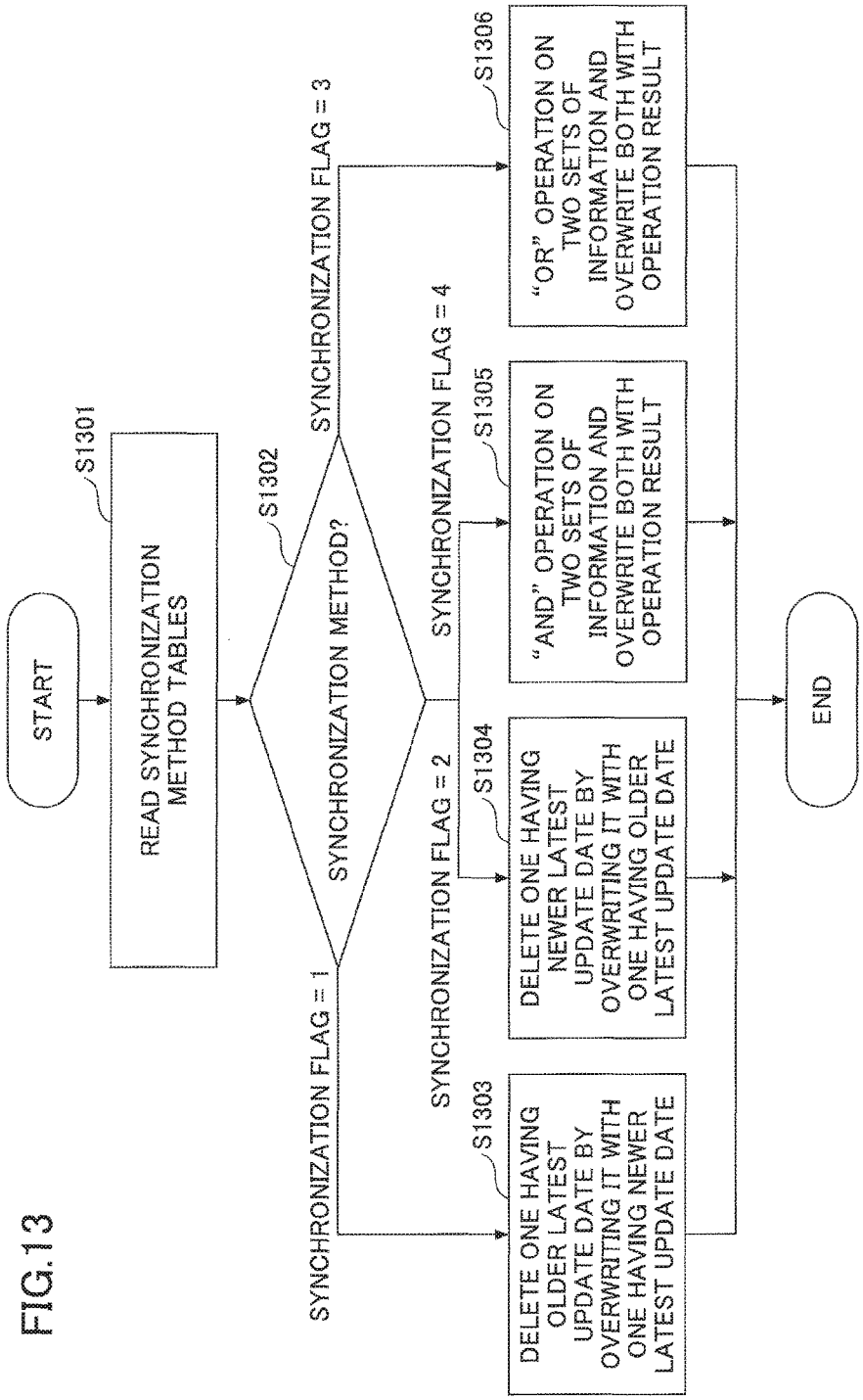
FIG. 13 is a flowchart illustrating a process of generating synchronization information and reflecting the synchronization information.

With reference to FIG. 13, generation of the synchronization information and reflection of the synchronization information will be described. FIG. 13 is a flowchart illustrating a process to generate the synchronization information and reflect the synchronization information. FIG. 13 illustrates details of steps S1110-S1114 in FIG. 11.

The user information synchronization part 272 reads the synchronization method tables 277 (step S1301).

Then, the user information synchronization part 272 selects the synchronization method from the synchronization method tables 277 using the synchronization flag that corresponds to the target database (step S1302).

If the synchronization flag is "1", the user information synchronization part 272 deletes the user information having the older "latest update date and time" by overwriting it with the user information having the newer "latest update date and time", (step S1303), and ends the synchronization process. In this case, the synchronization information is the user information having the newer "latest update date and time".

If the synchronization flag is "2", the user information synchronization part 272 deletes the user information having the newer "latest update date and time" by overwriting it with the user information having the older "latest update date and time", (step S1304), and ends the synchronization process. In this case, the synchronization information is the user information having the older "latest update date and time".

If the synchronization flag is "3", the user information synchronization part 272 carries out a logical conjunction ("AND") operation on the two sets of user information, reflects the operation result in the user information databases 210 and 310 (step S1305), and ends the synchronization process. In this case, the user information acquired through the logical conjunction ("AND") operation of the two sets of user information is the synchronization information.

If the synchronization flag is "4", the user information synchronization part 272 carries out a logical addition ("OR") operation on the two sets of user information, reflects the operation result in the user information databases 210 and 310 (step S1306), and ends the synchronization process. In this case, the user information acquired through the logical addition ("OR") operation of the two sets of user information is the synchronization information.

The process of FIG. 13 is carried out also in each of the synchronization processes for the databases other than the user information databases 210 and 310 in the same way.

Next, the synchronization process of the card information databases 220 and 320 will be described.

Figure 14:
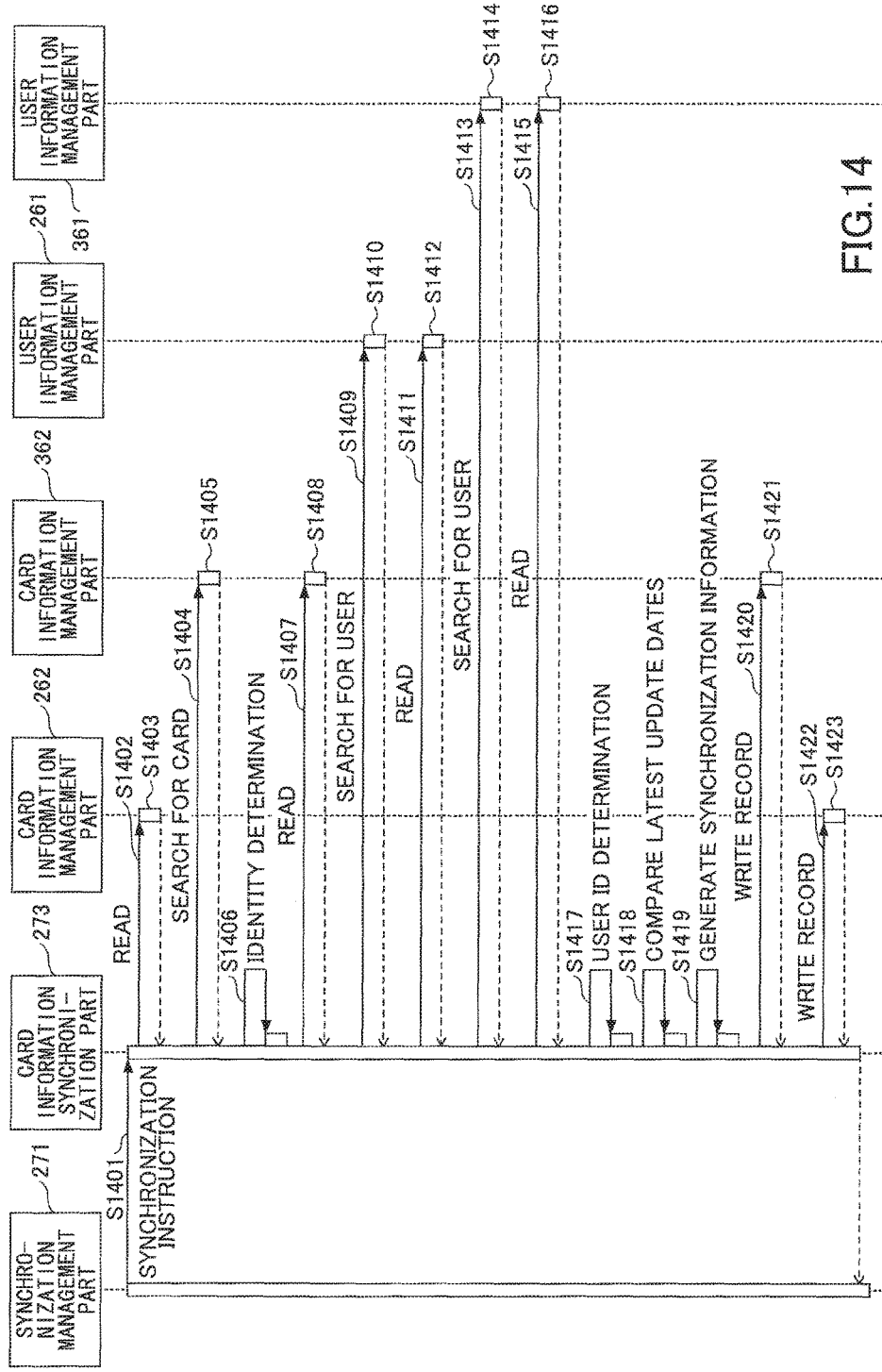
FIG. 14 is a sequence diagram illustrating a process of synchronizing the card information database.

FIG. 14 is a sequence diagram illustrating the synchronization process of the card information databases 220 and 310. FIG. 14 illustrates the synchronization process for the case where it is determined in the identity determination process that the authentication servers 200 and 300 have card information with the same card ID.

The synchronization management part 271 of the authentication server 200 sends, to the card information synchronization part 273, a synchronization instruction for the card information of the card ID "1" (step S1401).

The card information synchronization part 273 receives the synchronization instruction, and it requests the card information management part 262 to read the card information having the card ID "1" (step S1402). The card information management part 262 receives the request, it then reads from the card information database 220 the card information having the card ID "1", and transfers it to the card information synchronization part 273 (step S1403).

The card information synchronization part 273 then requests the card information management part 362 to search for the card information having the card ID "1" (step S1404). The card information management part 362 receives the request, it then searches the card information database 320 using the card ID "1" as a search key, and transfers the search result to the card information synchronization part 273 (step S1405).

Then, the card information synchronization part 273 receives the search result, and carries out a card information identity determination operation (step S1406). That is, the card information synchronization part 273 determines whether the card information databases 220 and 320 have the card information including the same card ID.

If the card information database 320 includes the corresponding card information in step S1406, the card information synchronization part 273 requests the card information management part 362 to read the corresponding card information (step S1407). If the card information database 320 does not include the corresponding card information in step S1406, the card information synchronization part 273 can add the card information to the card information database 320. Details of adding the card information will be described later.

The card information management part 362 receives the request to read the card information, then reads from the card information database 320 the corresponding card information, and transfers it to the card information synchronization part 273 (step S1408). Steps S1404-S1408 can be included in steps S1404 and S1405 together.

The card information synchronization part 273 then requests the user information management part 261 to search for the user information corresponding to the user ID included in the card information acquired in step S1403 (step S1409). The user information management part 261 receives the request, and searches the user information database 210 (step S1410).

The card information synchronization part 273 then requests the user information management part 261 to acquire the corresponding search result (step S1411). The user information management part 261 receives the request, reads from the user information database 210 the user information of the corresponding search result, and transfers it to the card information synchronization part 273 (step S1412).

Then, the card information synchronization part 273 requests the user information management part 361 to search for the user information corresponding to the user identification name included in the user information acquired in step S1412 and search for the user information corresponding to the user ID included in the card information acquired in step S1408 (step S1413). The user information management part 361 receives the request, and searches the user information database 310 using the user identification name and the user ID as search keys (step S1414).

Then, the card information synchronization part 273 requests the user information management part 361 to acquire the corresponding search result of step S1414 (step S1415). The user information management part 361 receives the request, reads from the user information database 310 the corresponding user information of the search result, and transfers it to the card information synchronization part 273 (step S1416).

The card information synchronization part 273 then carries out a card determination based on the two sets of card information acquired in steps S1403 and S1408, respectively, and the two sets of user information acquired in steps S1412 and S1416, respectively. That is, for example, if the respective user identification names of the two sets of user information are the same, it is determined that the two sets of card information acquired in steps S1403 and 1408 correspond to the same user, and thus, the two sets of card information are those to reflect the same synchronization information, even if the user IDs of the two sets of card information are different, for example. In this case, the card information synchronization part 273 determines that the user ID of the user information acquired from the user information database 310 in step S1416 as the user ID, for which the synchronization information can be reflected in the card information database 320 (step S1417).

The card information synchronization part 273 then compares the latest update dates and times included in the two sets of card information acquired in steps S1403 and step S1408, respectively (step S1418). If the latest update dates and times are the same in step S1418, it is determined that the information is the same between the authentication server 200 and the authentication server 300, and synchronization is not needed. Thus, the process ends. If they are not the same, the process proceeds to step S1419. In step S1418, not only the latest update dates and times but also all the items of the card information can be compared to determine whether to carry out synchronization.

Then, the card information synchronization part 273 generates the synchronization information to be reflected in the card information databases 220 and 320 with reference to the synchronization method tables 277 stored in the table storage part 276 (step S1419).

Based on the synchronization method determination result of step S1419, the card information synchronization part 273 requests the card information management part 362 to reflect the synchronization information (step S1420). The card information management part 362 reflects the synchronization information in the card information database 320 (step S1421).

Then, if necessary, the card information synchronization part 273 requests the user information management part 261 to search for the user information corresponding to the user identification name included in the user information acquired in step S1416, and acquires the corresponding search result. Then, based on the synchronization method determination result of step S1419, the card information synchronization part 273 requests the card information management part 262 to reflect the synchronization information (step S1422).

For example, when the card information database 220 is to be synchronized with the card information database 320, the card information synchronization part 273 requests the user information management part 261 to search the user information database 210 using the user identification name included in the user information corresponding to the user ID included in the target card information of the card information database 320. The card information synchronization part 273 then acquires the user information of the search result from the user information management part 261, and requests the card information management part 262 to reflect the target card information of the card information database 320 in the corresponding card information of the card information database 220 having the user ID of the thus acquired user information. Thus, the card information management part 262 reflects the synchronization information in the card information database 220 (step S1423), and ends the synchronization process.

Figure 15:
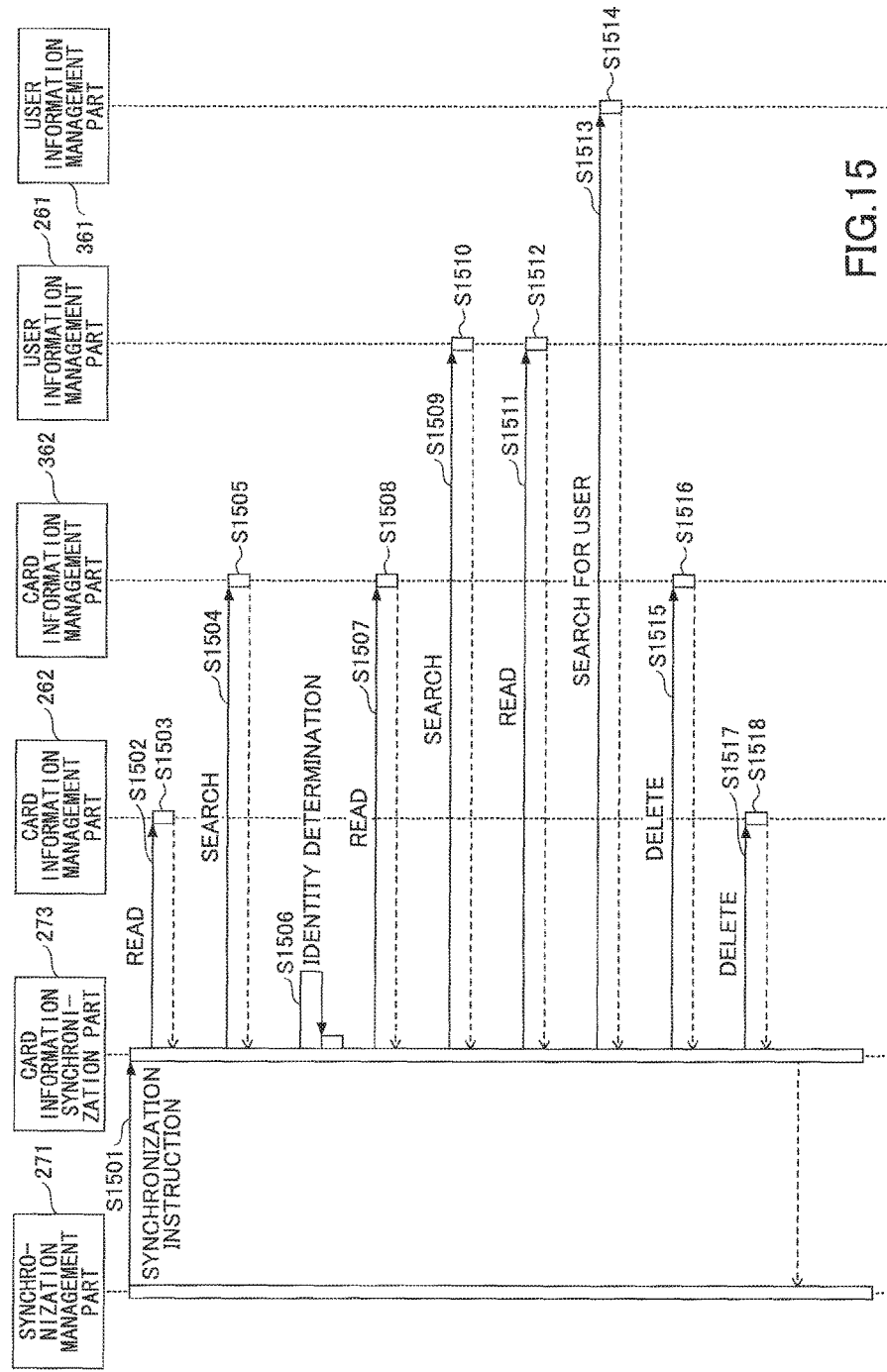
FIG. 15 is a sequence diagram illustrating another process of synchronizing the card information database.

FIG. 15 is a sequence diagram also illustrating the synchronization process of the card information database. However, FIG. 15 illustrates a case where, although it is determined in the identity determination process that the authentication servers 200 and 300 have the respective sets of card information including the same card ID, these sets of card information are associated with the respective sets of user information of different users.

Steps S1501-S1514 is the same as or similar to steps S1401-S1414, and thus, the duplicate description will be omitted.

The card information synchronization part 273 determines from the search result of step S1514 that the authentication server 300 does not include the user information of the same user ID included in the card information acquired in step S1508. This means that no user is present, who is associated with the IC card, concerning the authentication server 300. Thus, the card information of the IC card may be unauthorized.

Therefore, the card information synchronization part 273 requests the card information management part 362 to delete the card information read in step S1508 (step S1515). The card information management part 362 receives the request, and deletes from the card information database 320 the corresponding card information (step S1516).

Then, the card information synchronization part 273 requests the card information management part 262 to delete the card information read in step S1503 (step S1517). The card information management part 262 receives the request, and deletes from the card information database 220 the corresponding card information (step S1518), and ends the synchronization process.

Figure 16:
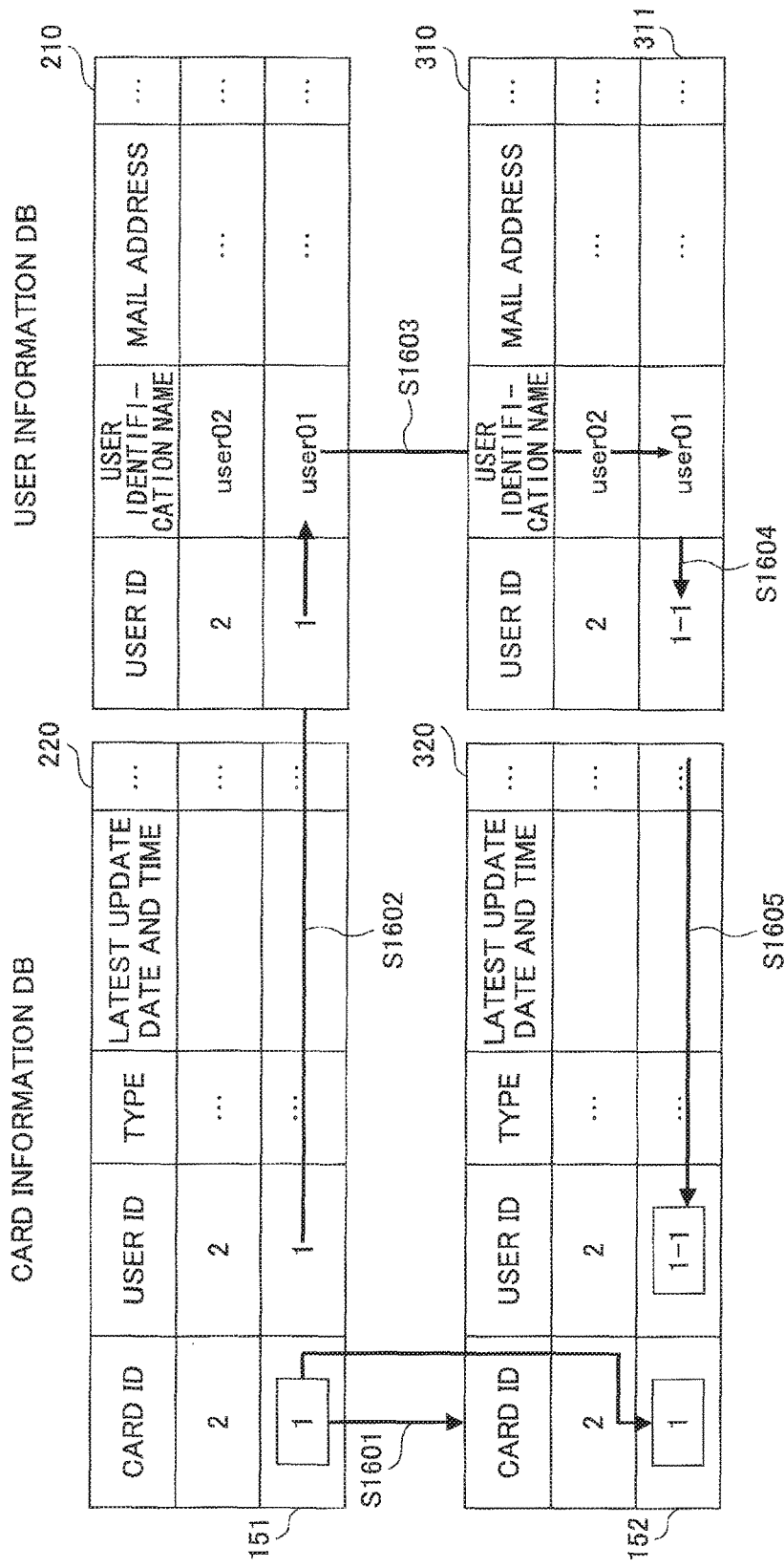
FIG. 16 illustrates addition of card information.

With reference to FIG. 16, addition of the card information will be described. FIG. 16 illustrates addition of the card information.

If the card information synchronization part 273 determines in the identity determination that the card information database 320 does not include the card information 152 having the card ID "1" (step S1601), it acquires the user ID "1" from the card information 151 of the card information database 220 that includes the card ID "1". The card information synchronization part 273 causes the user information management part 261 to search the user information database 210 using the user ID "1" as a search key, and acquires the user identification name "User01" that corresponds to the user ID "1" (step S1602).

The card information synchronization part 273 requests the user information management part 361 to search for the user information including the same user identification name "User01" (step S1603). In the example of FIG. 16, as the search result, the user information 311 is read, and the user ID "1-1" included in the user information 311 is acquired (step S1604).

The card information synchronization part 273 generates the card information 152 from the card information 151 where the user ID is replaced with the user ID "1-1" acquired in step S1604, and stores it in the card information database 320 (step S1605).

Thus, according to the first embodiment, if the card information having the same card ID is not included in the authentication server 300, the card information is added to the authentication server 300, to correspond to the user information of the authentication server 300. Thereby, even if information of some of a plurality of IC cards of a user is stored in the authentication server 200, and information of other cards of the plurality of IC cards of the user is stored in the authentication server 300, synchronization can be achieved without losing the card information. Thus, also after the synchronization process, the plurality of IC cards of the user can be used.

Figure 17:
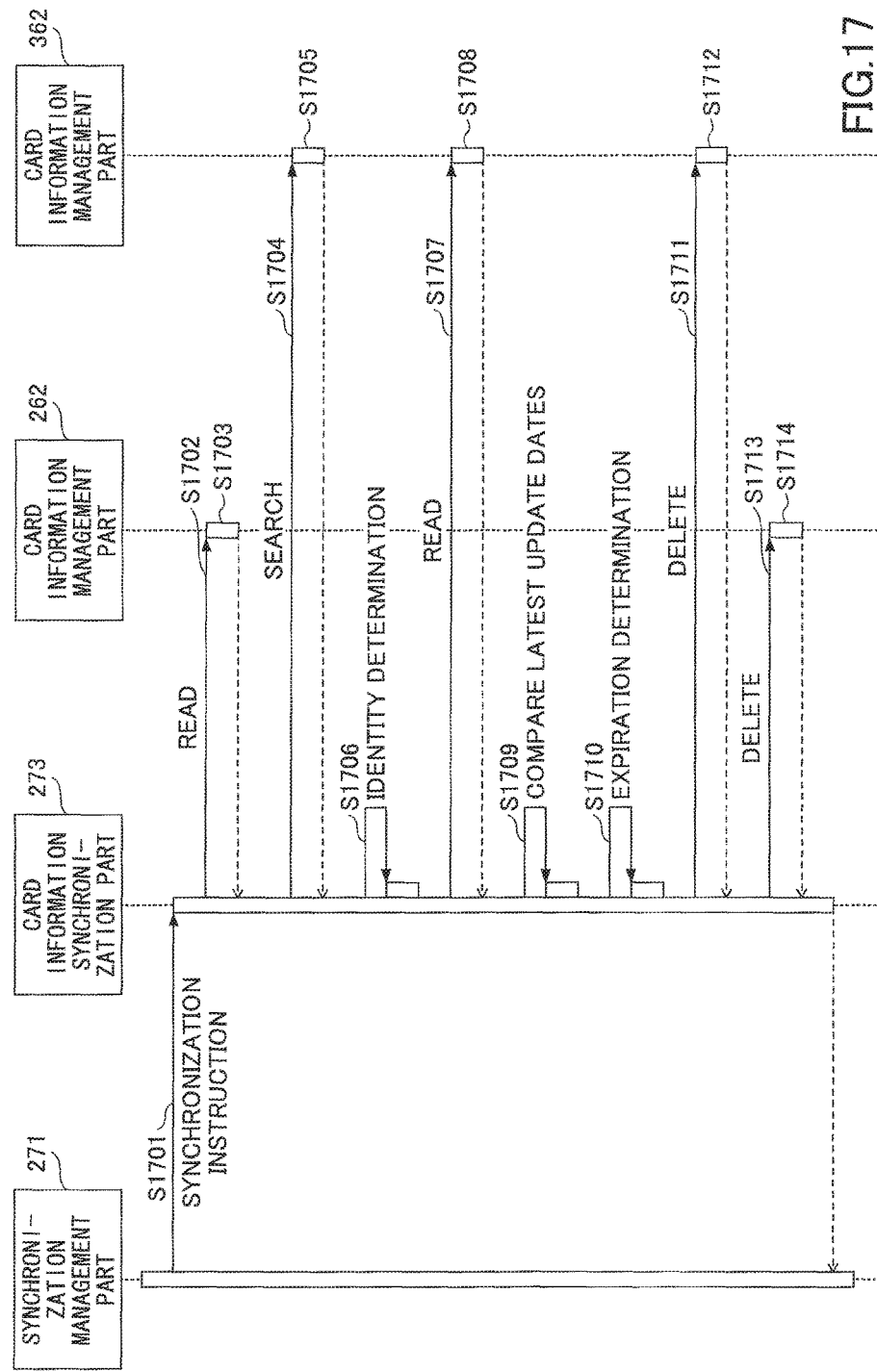
FIG. 17 is a sequence diagram illustrating a process of deleting expired card information.

With reference to FIG. 17, a process of deleting the card information of an expired card from the authentication server 200 and the authentication server 300 will be described. FIG. 17 is a sequence diagram illustrating a process of deleting the expired card information.

Steps S1701-S1708 of FIG. 17 are the same as or similar to steps S1401-S1408 of FIG. 14. Thus, the duplicate description will be omitted.

Subsequent to step S1708, the card information synchronization part 273 compares the respective latest update dates and times included in the acquired two sets of card information (step S1709).

Then, the card information synchronization part 273 determines whether the expiration date or time has expired at the newer "latest update date and time" (step S1710).

If the expiration date or time has expired in step S1710, the card information synchronization part 273 requests the card information management part 362 to delete the card information acquired in step S1708 (step S1711). The card information management part 362 receives the request to delete from the card information database 320 the corresponding card information (step S1712).

The card information synchronization part 273 requests the card information management part 262 to delete the card information acquired in step S1703 (step S1713). The card information management part 262 receives the request to delete from the card information database 220 the corresponding card information (step S1714), and ends the process.

Figure 18:
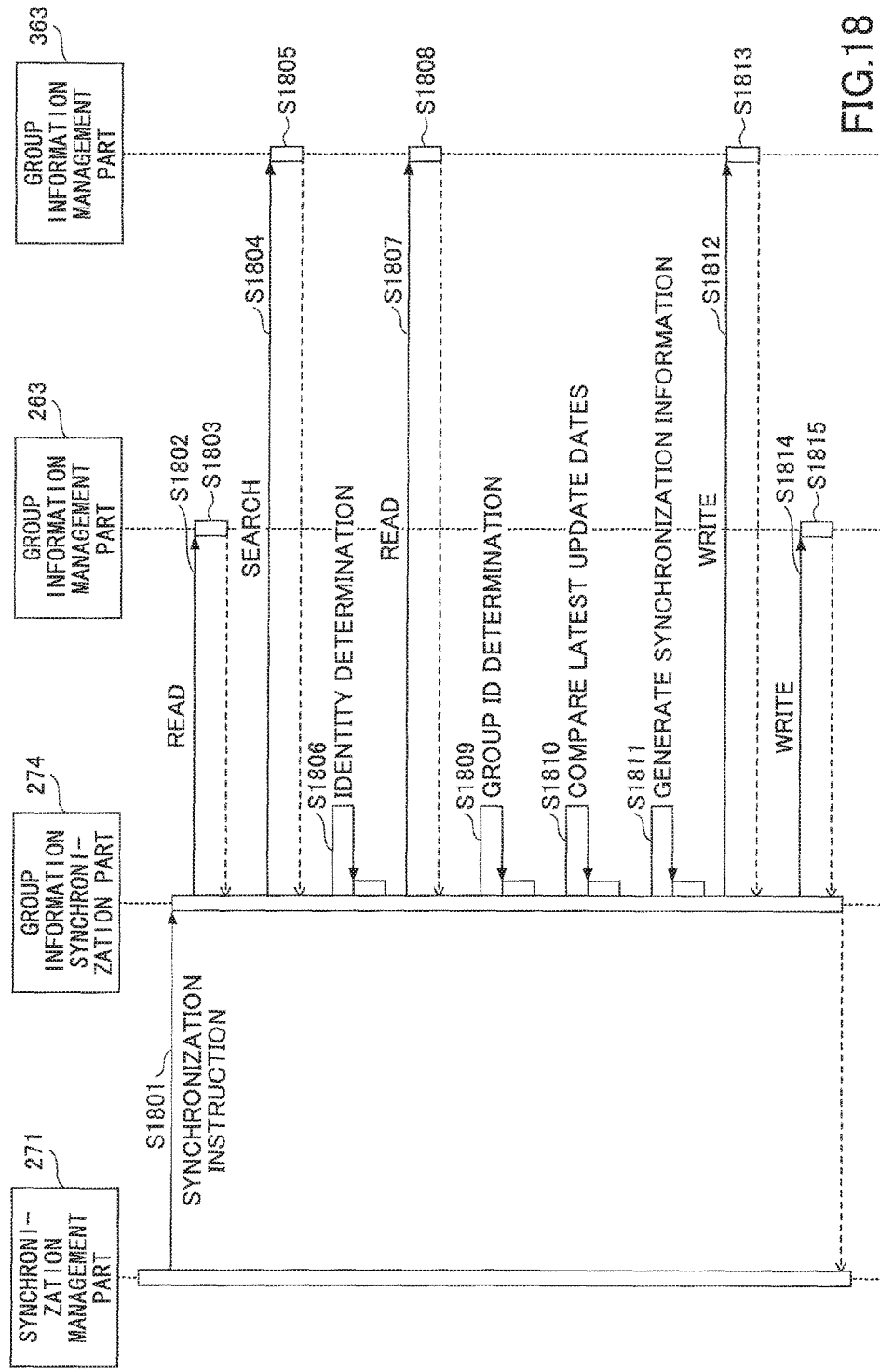
FIG. 18 is a sequence diagram illustrating a process of synchronizing the group information database.

With reference to FIG. 18, the synchronization processes on the group information databases 230 and 330 will be described.

FIG. 18 is a sequence diagram illustrating the synchronization process of the group information database. FIG. 18 illustrates the synchronization process for a case where the group information having the group ID "1" is to be processed. FIG. 18 also illustrates a process for a case where, in the identity determination process, it is determined that the authentication server 200 and the authentication server 300 include the group information of the same group.

In the authentication server 200, the synchronization management part 271 sends a synchronization instruction to the group information synchronization part 274 for the group information of the group ID "1" (step S1801).

The group information synchronization part 274 receives the synchronization instruction to request the group information management part 263 to read the group information of the group ID "1" (step S1802). The group information management part 263 receives the request to read from the group information database 230 the group information of the group ID "1", and transfers it to the group information synchronization part 274 (step S1803). At this time, the group information management part 263 acquires the group identification name "Group01" included in the acquired group information.

The group information synchronization part 274 then requests the group information management part 363 of the authentication server 300 to search the group information database 330 using the group identification name "Group01" as a search key (step S1804). The group information management part 363 searches the group information database 330 using the group identification name "Group01" as a search key, and transfers the corresponding search result to the group information synchronization part 274 (step S1805).

The group information synchronization part 274 then carries out a group information identity determination based on the search result (step S1806).

If it is determined in step S1806 that also the group information database 330 includes the group identification name "Group01", the group information synchronization part 274 requests the group information management part 363 to read the group information having the same group identification name "Group01" (step S1807). The group information management part 363 receives the request to read from the group information database 330 the corresponding group information, and transfers it to the group information synchronization part 274 (step S1808).

Steps S1804-S1808 can be included in steps S1804 and S1805 together.

The group information synchronization part 273 carries out a group determination based on the two sets of group information acquired in steps S1803 and S1808, respectively (step S1809).

That is, the group IDs of the two sets of group information, including the same group identification names "Group01", are determined, in which the same synchronization information is to be reflected.

The group information synchronization part 274 then compares the latest update dates and times of the two sets of group information acquired in steps S1803 and S1808, respectively (step S1810). If the latest update dates and times are the same, the group information synchronization part 274 determines that the authentication server 200 and the authentication server 300 have the same information, and thus, synchronization does not need to be carried out, and ends the process. If the latest update dates and times are not the same, the group information synchronization part 274 determines that the authentication server 200 and the authentication server 300 do not have the same information, and thus, synchronization needs to be carried out, and proceeds to step S1811. In step S1810, not only the latest update dates and times but also all the items of group information can be compared to determine whether synchronization needs to be carried out.

The group information synchronization part 274 generates the group information (synchronization information) to be reflected in the group information database 330 with reference to the synchronization method tables 277 stored in the table storage part 276 (step S1811).

Based on the synchronization method determination result of step S1810, the group information synchronization part 274 requests the group information management part 363 to reflect the synchronization information (step S1812). The group information management part 363 reflects the synchronization information in the group information database 330 (step S1813).

Based on the synchronization method determination result of step S1810, the group information synchronization part 274 requests the group information management part 263 to reflect the synchronization information (step S1814). The group information management part 263 reflects the synchronization information in the group information database 230 (step S1815), and ends the synchronization process. The group information synchronization part 274 carries out the process of FIG. 18 on all the sets of group information stored in the group information database 230.

If, in S1806, it is determined that the group information database 330 does not include the group information of the same group, the group information synchronization part 274 can skip over steps S1807-S1811, add the group information acquired in S1802 to the group information database 330 in steps S1812 and S1813. At this time, steps S1814-S1815 can be omitted.

Figure 19:
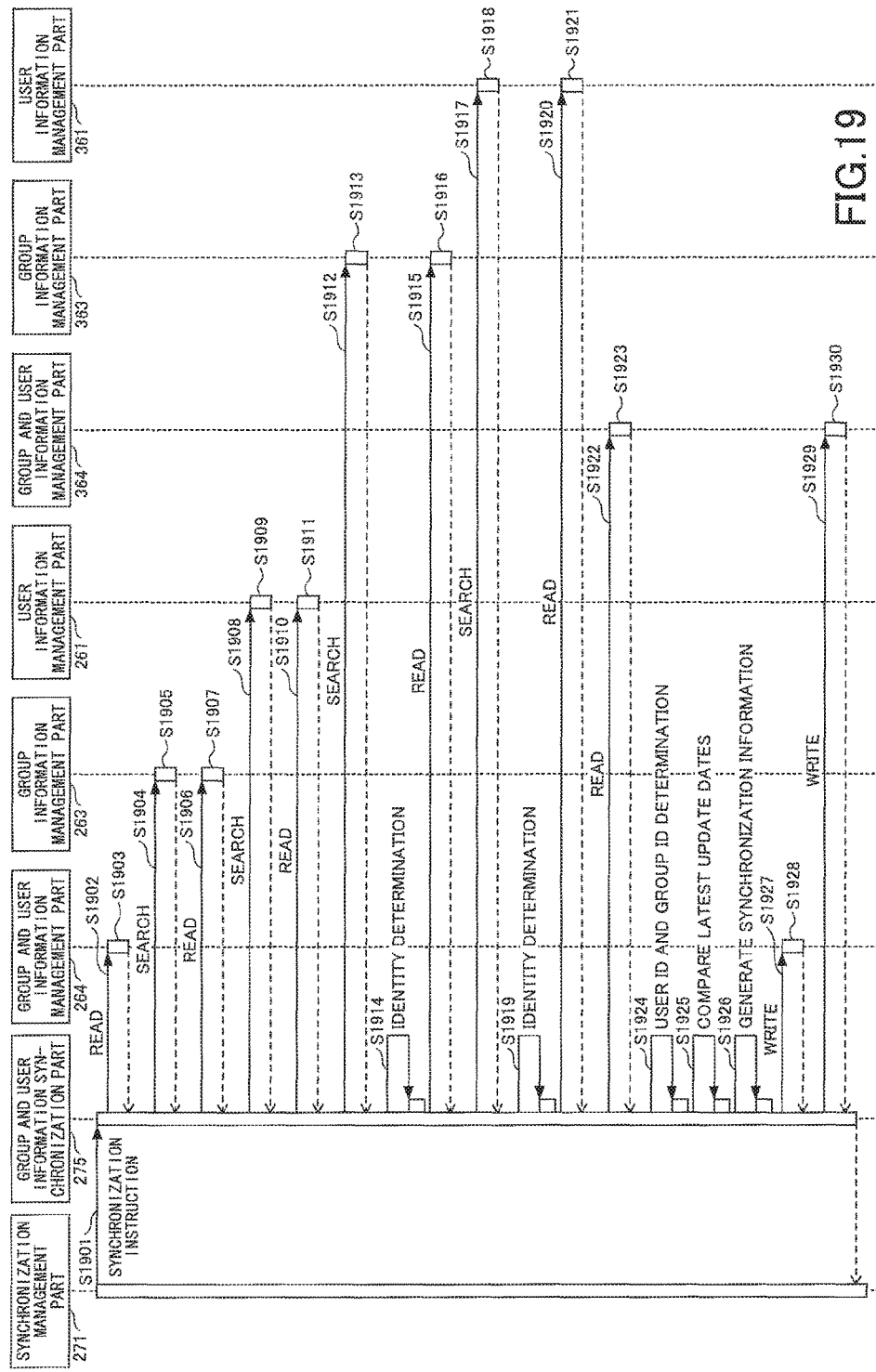
FIG. 19 is a sequence diagram illustrating a process of synchronizing the group and user information database.

With reference to FIG. 19, the synchronization processes on the group and user information databases 240 and 340 will be described. FIG. 19 is a sequence diagram illustrating the synchronization process of the group and user information database.

In the authentication server 200, the synchronization management part 271 sends a synchronization instruction to the group and user information synchronization part 275 for the group and user information (step S1901).

The group and user information synchronization part 275 receives the synchronization instruction to request the group and user information management part 264 to read the group and user information (step S1902). The group and user information management part 264 receives the request to read the group and user information from the group and user information database 240, and transfers it to the group and user information synchronization part 275 (step S1903).

The group and user information synchronization part 275 acquires the group ID from the acquired group and user information, and requests the group information management part 263 to search using the group ID (step S1904). The group information management part 263 receives the search request to search the group information database 230 using the group ID as a search key, and transfers the corresponding search result to the group and user information synchronization part 275 (step S1905).

The group and user information synchronization part 275 receives the search result and requests the group information management part 263 to read the group information of the search result (step S1906). The group information management part 263 receives the request to transfer the group information of the search result to the group and user information synchronization part 275 (step S1907).

The group and user information synchronization part 275 acquires the user ID from the group and user information acquired in step S1903, and requests the user information management part 261 to search using the user ID (step S1908). The user information management part 261 receives the search request to search the user information database 210 using the user ID as a search key, and transfers the corresponding search result to the group and user information synchronization part 275 (step S1909).

The group and user information synchronization part 275 receives the search result, and requests the user information management part 261 to read the corresponding user information of the search result (step S1910). The user information management part 261 receives the request to transfer the user information of the search result to the group and user information synchronization part 275 (step S1911).

The group and user information synchronization part 275 requests the group information management part 363 to search using the group identification name included in the group information acquired in step S1905 (step S1912). The group information management part 363 receives the search request to search the group information database 330 using the group identification name as a search key, and transfers the corresponding search result to the group and user information synchronization part 275 (step S1913).

The group and user information synchronization part 275 carries out an identity determination process based on the search result (step S1914). That is, the group and user information synchronization part 275 determines in step S1914 whether both the authentication servers 200 and 300 include the group information of the same group, i.e., having the same group identification name.

The process starting from step S1915 of FIG. 19 is a process for a case where both the authentication servers 200 and 300 include the group information of the same group.

If it is determined in the identity determination process that the group information database 330 includes the corresponding group information, the group and user information synchronization part 275 requests the group information management part 363 to read the group information of the search result of step S1913 (step S1915). The group information management part 363 receives the request to read the group information of the search result from the group information database 330, and transfers it to the group and user information synchronization part 275 (step S1916).

The group and user information synchronization part 275 requests the user information management part 361 to carry out a search using the user identification name included in the user information acquired in step S1911 (step S1917). The user information management part 361 receives the search request to search the user information database 310 using the user identification name as a search key, and transfers the corresponding search result to the group and user information synchronization part 275 (step S1918).

The group and user information synchronization part 275 carries out an identity determination process based on the search result (step S1919). That is, the group and user information synchronization part 275 determines whether the user information of the same user as the user who is identified by the user information acquired in step S1911 is included in the authentication server 300.

The process subsequent to step S1919 of FIG. 19 is a process for a case where the authentication server 300 includes the user information of the same user as the user who is identified by the user ID included in the group and user information.

If it is determined in the identity determination process that the user information database 310 includes the corresponding user information, the group and user information synchronization part 275 requests the user information management part 361 to read the corresponding user information of the search result of step S1918 (step S1920). The user information management part 361 receives the request to read from the user information database 310 the corresponding user information of the search result, and transfers it to the group and user information synchronization part 275 (step S1921).

The group and user information synchronization part 275 requests the group and user information management part 364 to read the group and user information that includes the group ID included in the group information acquired in step S1916 and the user ID included in the sets of user information acquired in step S1921 (step S1922). Steps S1912-S1916 can be included together in steps S1912 and S1913. Steps S1917-S1921 can be included together in steps S1917 and S1918.

The group and user information management part 364 receives the request to read from the group and user information database 340 the group and user information that includes the group ID and the user ID, and transfers it to the group and user information synchronization part 275 (step S1923).

The group and user information synchronization part 275 carries out a group and user determination process based on the sets of group and user information that are read in steps S1903 and S1923, respectively (step S1924).

That is, based on the group identification name and the user identification name, the corresponding group ID(s) and the corresponding user ID(s) are determined between the authentication servers 200 and 300, in which the corresponding synchronization information is to be reflected, respectively.

The group and user information synchronization part 275 then compares the latest update dates and times of the two sets of group and user information (step S1925). If the latest update dates and times are the same in step S1925, the group and user information synchronization part 275 determines that the authentication server 200 and the authentication server 300 have the same information, and synchronization needs not to be carried out, and ends the process. If the latest update dates and times are not the same in step S1925, the group and user information synchronization part 275 determines that the authentication server 200 and the authentication server 300 do not have the same information, and synchronization needs to be carried out, and proceeds to step S1926. In step S1925, not only the latest update dates and times but also all the items of group and user information can be compared to determine whether synchronization needs to be carried out.

The group and user information synchronization part 275 generates synchronization information to be reflected in the group and user information databases 240 and 340 with reference to the synchronization method tables 277 stored in the table storage part 276 (step S1926).

Based on the synchronization method determination result of step S1926, the group and user information synchronization part 275 requests the group and user information management part 264 to reflect the synchronization information (step S1927). The group and user information management part 264 reflects the synchronization information in the group and user information database 240 (step S1928).

Based on the synchronization method determination result in step S1926, the group and user information synchronization part 275 requests the group and user information management part 364 to reflect the synchronization information (step S1929). The group and user information management part 364 reflects the synchronization information in the group and user information database 340 (step S1930), and ends the synchronization process.

The group and user information synchronization part 275 carries out the process of FIG. 19 on all the sets of group and user information stored in the group and user information database 240. If The group and user information synchronization part 275 cannot acquire the corresponding group and user information from the group and user information database 340 in step S1923, it can request the group and user information database 340 to newly register the corresponding group and user information based on the group ID acquired in step S1916 and the user ID acquired in step S1921.

Figure 20:
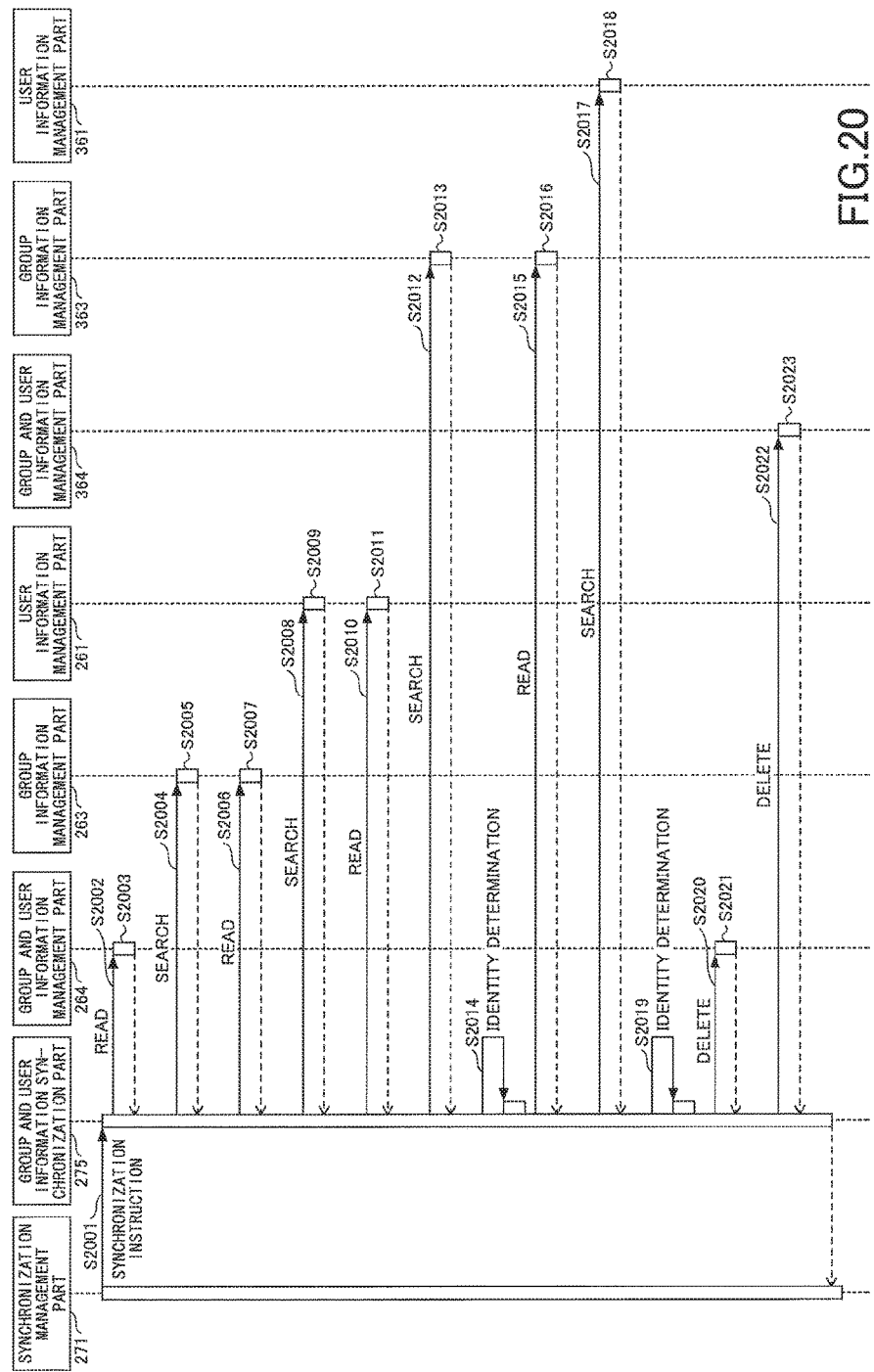
FIG. 20 is a sequence diagram illustrating a process of deleting inconsistent group and user information.

With reference to FIG. 20, a process for a case where inconsistent group and user information is present will be described. FIG. 20 is a sequence diagram illustrating a process to delete inconsistent group and user information.

Steps S2001-S2019 of FIG. 20 are the same as or similar to steps S1901-S1919 of FIG. 19, and therefore, the duplicate description will be omitted.

If it is determined in the identity determination process of step S2019 that the user information of the same user as the user identified by the user ID included in the user information acquired in step S2011 is not included in the user information database 310, the group and user information synchronization part 275 requests the group and user information management part 264 to delete the group and user information acquired in step S2003 (step S2020). The group and user information management part 264 receives the request to delete the corresponding group and user information from the group and user information database 240 (step S2021).

The group and user information synchronization part 275 requests the group and user information management part 364 to delete the group and user information including the group ID included in the group information acquired in step S2016 (step S2022). The group and user information management part 364 receives the request to delete the corresponding group and user information from the group and user information database 240 (step S2023).

Figure 21:
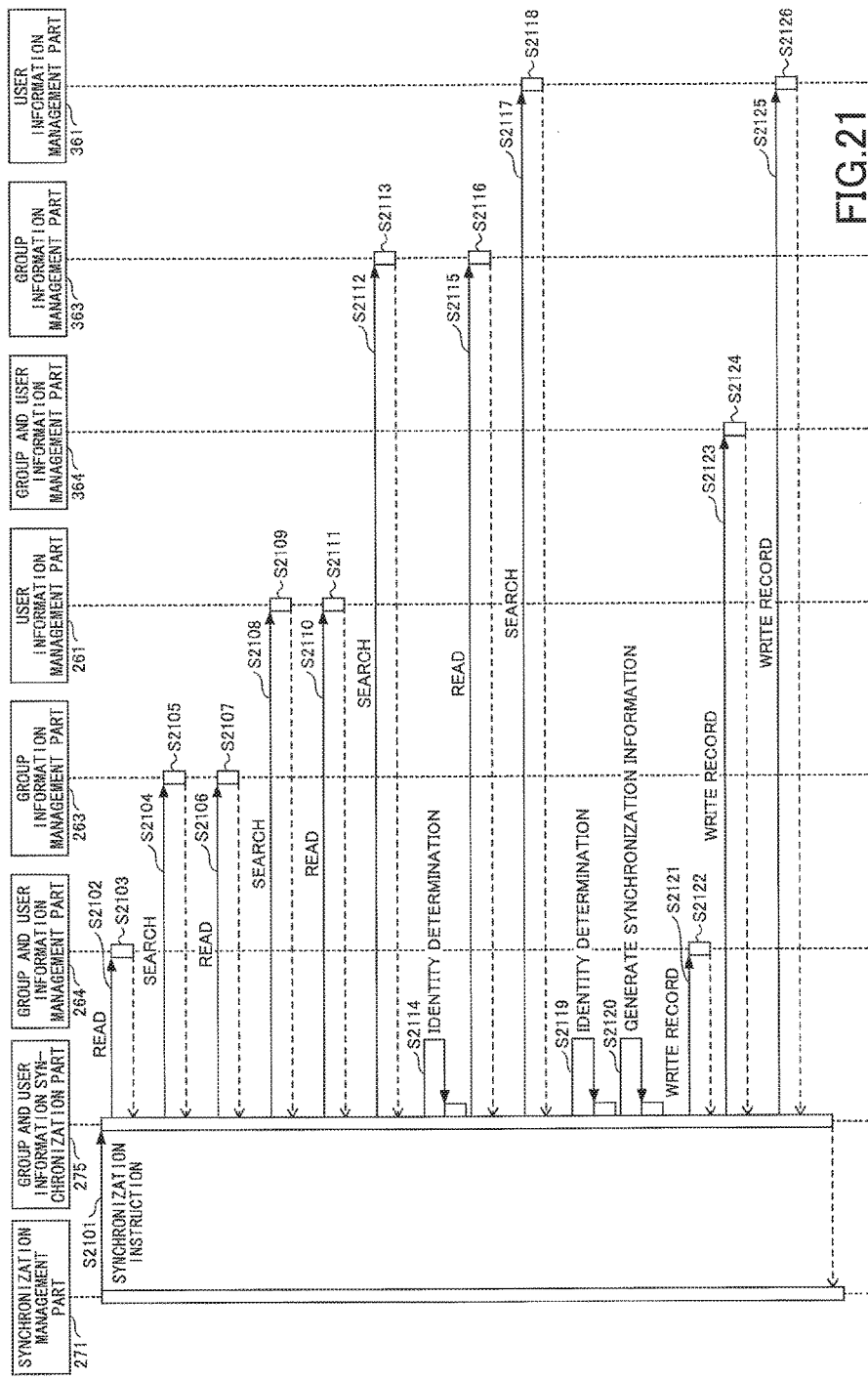
FIG. 21 is a sequence diagram illustrating a process of complementing inconsistent group and user information.

FIG. 21 is a sequence diagram illustrating a process to complement inconsistent group and user information. Steps S2101-S2119 of FIG. 21 are the same or similar to steps S1901-S1919 of FIG. 19. Therefore, duplicate description will be omitted.

If it is determined in the identity determination process of step S2119 that the user information database 310 does not include the user information of the same user as the user identified by the user ID included in the user information acquired in step S2111, the group and user information synchronization part 275 generates the synchronization information (step S2120).

Specifically, the group and user information synchronization part 275 uses the user information acquired in step S2111 as the synchronization information to be reflected in the user information database 310. The group and user information synchronization part 275 uses the user ID that is used when the synchronization information is reflected in the user information database 310 as the user ID to be used when the synchronization information is reflected in the group and user information database 340. The group and user information synchronization part 275 uses the group ID of the group information acquired in step S2116 as the group ID to be used when the synchronization information is reflected in the group and user information database 340. The synchronization information to be reflected in the group and user information database 240 is generated in the same way as the way of step S1926 of FIG. 19.

The group and user information synchronization part 275 requests the group and user information management part 264 to reflect the synchronization information (group and user information) generated in step S2120 (step S2121). The group and user information management part 264 receives the request to reflect the synchronization information in the group and user information database 240 (step S2122).

The group and user information synchronization part 275 requests the group and user information management part 364 to reflect the synchronization information (group and user information) generated in step S2120 (step S2123). The group and user information management part 364 receives the request to reflect the synchronization information in the group and user information database 340 (step S2124).

The group and user information synchronization part 275 requests the user information management part 361 to reflect the synchronization information (user information) generated in step S2120 (step S2125). The user information management part 361 receives the request to reflect the synchronization information in the user information database 310, and thus, add (stores) the user information generated as the synchronization information (step S2126).

Alternatively, after the synchronization information is thus reflected in the user information database 310, and thus, the user information generated as the synchronization information is added thereto (stored therein) (step S2126), the user ID used there can be reflected in the synchronization information (group and user information), and then, the synchronization information can be reflected in the group and user information database 340 (step S2124).

Concerning the embodiments, a case where the authentication server 300 is synchronized with the authentication server 200 has been described. However, embodiments are not limited thereto. In the authentication system 100, if the authentication server 200 is synchronized with the authentication server 300, the respective synchronization parts of the synchronization process part 270 can determine whether the information that is read from each database of the authentication server 200 is the same as the information that is read from the corresponding database of the authentication server 300.

Thus, according to the embodiments, a plurality of authentication servers can be synchronized without losing information.

Thus, the authentication systems, the synchronization methods, and the authentication apparatuses have been described in the embodiments. However, embodiments are not limited to the above-described embodiments, and various modifications and replacements can be made.

What is claimed is:

1. An authentication system including a first authentication apparatus and a second authentication apparatus, the authentication system performing authentication based on information read from an IC card, and the authentication system comprising at least one processor, the at least one processor being configured to:

receive a first user identifier and first card information read from a first IC card read by a first card reader, the first user identifier identifying a first user and the first card information including information associated with the first IC card;

search a first storage unit of the first authentication apparatus for first user information using the first user identifier, the first user information including information that uniquely identifies the first user in the first authentication apparatus and the second authentication apparatus;

transmit the first user identifier to the second authentication apparatus;

receive second user information and second card information from the second authentication apparatus, the second user information including information that identifies the first user, the second user information and second card information associated with the first user identifier in a second storage unit of the second authentication apparatus;

update the first user information associated with the first user identifier stored in the first storage unit of the first authentication apparatus to the second user information associated with a second user identifier stored in the second storage unit of the second authentication apparatus or update the second user information to the first user information, if the second user identifier received from the second authentication apparatus is the same as the first user identifier; and associate the first card information with the first user identifier and store the first card information in the first storage unit, if the first card information corresponding to the second card information stored in the second storage unit is not stored in the first storage unit and the first user corresponding to the second user identifier associated with the second card information further has the first user identifier stored in the first storage unit.

2. The authentication system as claimed in claim 1, wherein the at least one processor is further configured to:
determine whether a first user identification name, included in the first user information, is the same as a second user identification name, included in the second user information; and
update the first user information to the second user information or update the second user information to the first user information, if the at least one processor determines that the first user identification name is the same as the second user identification name.

3. The authentication system as claimed in claim 2, wherein the at least one processor is further configured to:
determine a method of updating the first user information to the second user information or updating the second user information to the first user information, based on a result of comparison between a latest update date and time of the first user information included in the first user information, and a latest update date and time of the second user information included in the second user information.

4. The authentication system as claimed in claim 2, wherein the at least one processor is further configured to:
determine whether a first card identifier included in the first card information is the same as a second card identifier included in the second card information, if the first card information is stored in the first storage unit;
determine whether the first user information corresponding to the first user identifier included in the first IC card is the same as the second user information corresponding to the second user identifier included in a second IC card, if the at least one processor determines that first card identifier included in the first card information is the same as the second card identifier included in the second card information; and
update the first card information to the second card information or update the second card information to the first card information, if the at least one processor determines that the first user information is the same as the second user information.

5. The authentication system as claimed in claim 3, wherein the at least one processor is further configured to:
determine whether a first card identifier included in the first card information is the same as a second card identifier included in the second card information, if the first card information is stored in the first storage unit;
determine whether the first user information is the same as the second user information, if the at least one processor determines that first card identifier included in the first card information is the same as the second card identifier included in the second card information; and
update the first card information to the second card information or update the second card information to the first card information, if the at least one processor determines that the first user information is the same as the second user information.

6. The authentication system as claimed in claim 4, wherein the at least one processor is further configured to:
determine a method of updating the first card information to the second card information or updating the second card information to the first card information, based on a result of comparison between a latest update date and time of the first card information included in the first card information.

7. The authentication system as claimed in claim 5, wherein the at least one processor is further configured to:
determine a method of updating the first card information to the second card information or updating the second card information to the first card information, based on a result of comparison between a latest update date and time of the first card information included in the first card information.

8. The authentication system as claimed in claim 4, wherein the at least one processor is further configured to:
delete the first card information from the first storage unit and delete the second card information from the second storage unit, if the first card identifier is not the same as the second card identifier.

9. A synchronization method carried out by an authentication system that includes a first authentication apparatus with a first memory and a second authentication apparatus with a second memory, the authentication system performing authentication based on information read from an IC card, the synchronization method comprising:
receiving, using at least one processor, a first user identifier and first card information read from a first IC card read by a first card reader, the first user identifier identifying a first user and the first card information including information associated with the first IC card;
searching, using the at least one processor, a first storage unit of the first authentication apparatus for first user information using the first user identifier, the first user information including information that uniquely identifies the first user in the first authentication apparatus and the second authentication apparatus;
transmitting, using the at least one processor, the first user identifier to the second authentication apparatus;
receiving, using the at least one processor, second user information and second card information from the second authentication apparatus, the second user information including information that identifies the first user, the second user information and second card information associated with the first user identifier in a second storage unit of the second authentication apparatus;
updating, using the at least one processor, the first user information that is associated with the first user identifier in the first memory to the second user information that is associated with a second user identifier in the second memory, or updating the second user information to the first user information, if the second user identifier received from the second authentication apparatus is the same as the first user identifier; and
associating, using the at least one processor, the first card information with the first user identifier and storing the first card information in the first memory, if the first card information corresponding to the second card information stored in the second memory is not stored in the first memory and the first user corresponding to the second user identifier associated with the second card information further has the first user identifier stored in the first memory.

10. The synchronization method as claimed in claim 9, further comprising:
determining, using the at least one processor, whether a first user identification name, included in the first user information, is the same as a second user identification name, included in the second user information; and
updating, using the at least one processor, the first user information to the second user information or updating the second user information to the first user information, if it is determined that the first user identification name is the same as the second user identification name.

11. The synchronization method as claimed in claim 10, further comprising:
determining, using the at least one processor, a method of updating the first user information to the second user information or updating the second user information to the first user information, based on a result of comparison between a latest update date and time of the first user information included in the first user information, and a latest update date and time of the second user information included in the second user information.

12. The synchronization method as claimed in claim 10, further comprising:
determining, using the at least one processor, whether a first card identifier included in the first card information is the same as a second card identifier included in the second card information, if the first card information is stored in the first memory;
determining, using the at least one processor, whether the first user information corresponding to the first user identifier is the same as the second user information corresponding to the second user identifier, if the first card identifier is the same as the second card identifier; and
updating, using the at least one processor, the first card information to the second card information or updating the second card information to the first card information, if the first user information is the same as the second user information.

13. The synchronization method as claimed in claim 11, further comprising:
determining; using the at least one processor, whether a first card identifier included in the first card information is the same as a second card identifier included in the second card information, if the first card information is stored in the first memory;
determining, using the at least one processor, whether the first user information is the same as the second user information, if the first card identifier is the same as the second card identifier; and
updating, using the at least one processor, the first card information to the second card information or updating the second card information to the first card information, if the first user information is the same as the second user information.

14. The synchronization method as claimed in claim 12, further comprising:
determining, using the at least one processor, a method of updating the first card information to the second card information or updating the second card information to the first card information, based on a result of comparison between a latest update date and time of the first card information included in the first card information.

15. The synchronization method as claimed in claim 13, further comprising:
determining, using the at least one processor, a method of updating the first card information to the second card information or updating the second card information to the first card information, based on a result of comparison between a latest update date and time of the first card information included in the first card information.

16. The synchronization method as claimed in claim 12, further comprising:
deleting, using the at least one processor, the first card information from the first memory and deleting the second card information from the second memory, if the first card identifier is not the same as the second card identifier.

17. An authentication apparatus connected to another authentication apparatus, the authentication apparatus performing authentication based on information read from an IC card, and the authentication apparatus comprising at least one processor, the at least one processor being configured to:
receive a first user identifier and first card information read from a first IC card read by a first card reader, the first user identifier identifying a first user and the first card information including information associated with the first IC card;
search a first storage unit of the authentication apparatus for first user information using the first user identifier, the first user information including information that uniquely identifies the first user in the authentication apparatus and the other authentication apparatus;
transmit the first user identifier to the other authentication apparatus;
receive second user information and second card information from the other authentication apparatus, the second user information including information that identifies the first user, the second user information and second card information associated with the first user identifier in a second storage unit of the other authentication apparatus;
update the first user information associated with the first user identifier stored in the first storage unit of the authentication apparatus to the second user information associated with a second user identifier stored in the second storage unit of the other authentication apparatus, or update the second user information to the first user information, if the second user identifier received from the other authentication apparatus is the same as the first user identifier; and
associate the first card information with the first user identifier and store the first card information in the first storage unit, if the first card information corresponding to the second card information stored in the second storage unit is not stored in the first storage unit and the first user corresponding to the second user identifier associated with the second card information further has the first user identifier stored in the first storage unit.

18. The authentication system according to claim 1, wherein
the first authentication apparatus has a higher priority than the second authentication apparatus; and
the second authentication apparatus is configured to perform authentication of the first user when the first authentication apparatus is incapable of performing authentication of the first user.

\* \* \* \* \*